(12) United States Patent
Wakashiro et al.

(10) Patent No.: US 6,523,626 B2
(45) Date of Patent: Feb. 25, 2003

(54) CONTROL DEVICE FOR HYBRID VEHICLES

(75) Inventors: Teruo Wakashiro, Wako (JP); Atsushi Matsubara, Wako (JP); Atsushi Izumiura, Wako (JP); Shinichi Kitajima, Wako (JP); Yasuo Nakamoto, Wako (JP); Hideyuki Oki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/855,515

(22) Filed: May 16, 2001

(65) Prior Publication Data

US 2001/0042648 A1 Nov. 22, 2001

(30) Foreign Application Priority Data

May 22, 2000 (JP) ......................... 2000-150661

(51) Int. Cl.$^7$ .............................. B60K 1/00; B60K 6/00
(52) U.S. Cl. ..................... 180/65.2; 180/65.3; 180/65.4
(58) Field of Search .............................. 180/65.1, 65.2, 180/65.3, 65.4

(56) References Cited

U.S. PATENT DOCUMENTS

| 5,469,816 A | | 11/1995 | Murakawa et al. | |
| 5,786,640 A | | 7/1998 | Sakai et al. | |
| 5,842,534 A | * | 12/1998 | Frank | 180/65.2 |
| 5,942,879 A | * | 8/1999 | Ibaraki | 180/65.2 |
| 5,984,033 A | * | 11/1999 | Tamagawa et al. | 180/65.2 |
| 6,070,680 A | * | 6/2000 | Oyama | 180/65.2 |
| 6,116,363 A | * | 9/2000 | Frank | 180/65.2 |

FOREIGN PATENT DOCUMENTS

| EP | 0 584 373 A1 | 3/1993 |
| EP | 0 856 427 A1 | 8/1998 |
| EP | 0 903 259 A2 | 3/1999 |

OTHER PUBLICATIONS

European Search Reported dated Feb. 6, 2002.

* cited by examiner

Primary Examiner—Christopher P. Schwartz
Assistant Examiner—Devon Kramer
(74) Attorney, Agent, or Firm—Armstrong, Westerman & Hattori, LLP

(57) ABSTRACT

A control device for a hybrid vehicle is provided, which executes charging of a capacitor when a depth-of-discharge of a capacitor exceeds a predetermined depth-of-discharge which is set based on a vehicle speed. The control device of the hybrid vehicle, provided with an engine, a motor for assisting the output of the engine, and a capacitor for supplying electric power to the motor and for storing regenerative energy, comprises a depth-of-discharge detecting device (S063) for detecting a depth-of-discharge DOD of the capacitor, wherein when the depth-of-discharge DOD of the capacitor falls below the depth-of-discharge limit value DODLMT (053), the capacitor is charged so as to recover the depth-of-discharge of the capacitor.

8 Claims, 20 Drawing Sheets

MTHAST TABLE

KPBRGN/KPBRGTH TABLE

CONTROL DEVICE FOR HYBRID VEHICLES

BACKGROUND OF THE INVENTION

1. Field of the Invention

The present invention relates to a control system for a hybrid vehicle driven by an engine and a motor, and in particular, relates to a control system of a hybrid vehicle capable of recovering the charge-discharge balance of the motor while travelling under conditions in which the power storage unit is liable to be excessively discharged.

2. Description of the Related Art

Conventionally, hybrid vehicles, which carry motors as power sources for driving in addition to engines, are known. Hybrid vehicles are divided into series hybrid vehicles and parallel hybrid vehicles. In the parallel hybrid vehicles, the motor connected to the engine assists the rotation of the drive shaft of the engine while charging a power storage unit using the motor as a generator. In parallel hybrid vehicles, a variety of control operations are executed so that the motor assists the engine at the time of acceleration and the power storage unit such as a battery or a capacitor is charged by deceleration regeneration at the time of deceleration, in order to maintain sufficient electric energy in the power storage unit including capacitors or a batteries (hereinafter, called a remaining charge, a "state of charge", or "remaining capacitor or battery charge") to meet the driver's demands. Specifically, because a high rate of deceleration regeneration is obtained after high speed cruising, the power storage unit regains a part of the consumed energy when decelerating. After the vehicle goes up a slope such as a mountain path, the vehicle can charge up the power storage unit by deceleration regeneration when the vehicle goes down the slope (as disclosed in, for example, Japanese Unexamined Patent Application, First Publication No. Hei 7-123509).

In general, conventional hybrid vehicles are often quickly accelerated, then decelerated, and quickly accelerated again. In this situation, the vehicle cannot obtain sufficient deceleration regeneration. A hybrid vehicle, after going up a slope, may often run on level ground. In the former case, the remaining charge is decreased as the vehicles runs because regeneration is not sufficient. In the latter case, unless the vehicle goes down a slope, the vehicle cannot regain the charge of the power storage unit consumed when going up the slope.

In addition, when a hybrid vehicle uses a capacitor, which has a lower storage charge than that of a battery, a problem arises in that, because of a small reserve in the remaining charge of the capacitor, the vehicle is liable to be subject to engine stop and the fuel efficiency is likely to deteriorate.

In order avoid such a problem, a control device of the vehicle controls charging of the motor in line with a threshold value of the remaining charge while monitoring the remaining charge of the power storage unit. However, when the threshold value is set at a higher remaining charge, it is likely that energy of the power storage unit cannot be recovered. In contrast, when the threshold value is set at a lower value, charging is often executed, causing deterioration of the fuel efficiency, or causing a situation that energy generated by deceleration regeneration cannot be recovered because the remaining charge is maintained at a higher level.

SUMMARY OF THE INVENTION

It is therefore an object of the present invention to provide a control device for a hybrid vehicle, capable of managing the remaining charge of the power storage unit at an optimum state when the power storage unit is liable to be excessively discharged and when it is determined that the remaining charge of the capacitor should be recovered.

The first aspect of the present invention provides a control device for a hybrid vehicle provided with an engine and a motor, at least one of which is used as a driving source, and a power storage unit for storing energy generated by the output from said engine and regenerative energy produced by regeneration by said motor when said vehicle decelerates, comprising, a depth of discharge detecting device for detecting a depth-of-discharge of said power storage unit, a depth-of-discharge threshold value setting device for setting a threshold value of the depth-of-discharge of said power storage unit based on a value associated with the kinetic energy of the vehicle from an initial depth-of-discharge at the time of starting of the vehicle; and a charge control device for charging said power storage unit when the depth-of-discharge of said power storage unit exceeds said threshold value of the depth-of-discharge.

According to the first aspect, when the depth-of-discharge of the power storage unit detected by the depth-of-discharge detection device exceeds a threshold value set by the depth-of-discharge threshold setting device for setting based on the vehicle speed, it becomes possible to charge the power storage unit when the depth-of-discharge exceeds a predetermined threshold value so that the fuel consumption can be effectively reduced by preventing unnecessary charging.

In the control device for the hybrid vehicle according to the second aspect, said value associated with the kinetic energy of the vehicle is represented by a vehicle speed.

In the control device for a hybrid vehicle according to the third aspect, said charge control device comprises a charge setting device for setting the charge based on the value associated with the vehicle speed when said depth-of-discharge exceeds the threshold value.

According to the third aspect, when the depth-of-discharge exceeds a threshold value, the present invention is capable of charging the power storage unit for the charge set by the charge setting device. In addition, considering that the regenerative energy increases as the vehicle speed increases, it is possible to set the charge to an increased amount as the vehicle speed increases and to set the charge to a decreased amount and to increase the charging frequency as the vehicle speed decreases so that the capacitor is charged effectively according to the vehicle speed.

In the control device for a hybrid vehicle according to the fourth aspect, when charging said power storage unit, said charge control device further comprises a charge increasing device for increasing the charge to a higher value than the charge after the depth-of-discharge exceeds the threshold value than that before the depth of discharge exceeds said threshold value.

According to the fourth aspect, the depth-of-discharge of the power storage unit after exceeding the threshold value can be increased to a higher value than that before exceeding the threshold value by the charge increasing device, it is possible to improve the fuel efficiency by preventing unnecessary charging in the high vehicle speed region, and it is also possible to reduce the likelihood of the engine stopping by preventing a decrease of the charging frequency in the low vehicle speed region.

In the control device for a hybrid vehicle according to the fifth aspect, while controlling the charge by the charge control device, said control device of the hybrid vehicle comprising a motor drive limit control device limits the driving of the vehicle by the motor.

According to the fifth aspect, while controlling the charge by the charge control device, it is possible to prevent the power storage unit from being discharged by limiting the motor drive by the motor drive limit control device, and the power storage unit can be managed without feeling concern of the over-discharge.

In the control device for the hybrid vehicle according to the sixth aspect, said motor drive limit control device corresponds to a determination threshold value modification device which modifies the motor drive determination threshold value based on the driving state of the vehicle so as to make it less likely to drive the vehicle by the motor.

According to the fifth aspect, since said motor drive limit control device, that is, the determination threshold modification device makes it possible to modify the motor drive determination threshold value so as to make it less likely to drive the vehicle by the motor, the frequency of the motor drive is reduced, this aspect of the present invention is effective in that the power storage unit can be recovered rapidly.

DETAILED DESCRIPTION OF THE INVENTION

Hereinafter, a preferable embodiment of the present invention is described with reference to the attached drawings. Although the power storage unit of the parallel hybrid vehicle is not limited to either a capacitor or a battery, a parallel hybrid vehicle provided with a capacitor will be explained.

Figure 1:
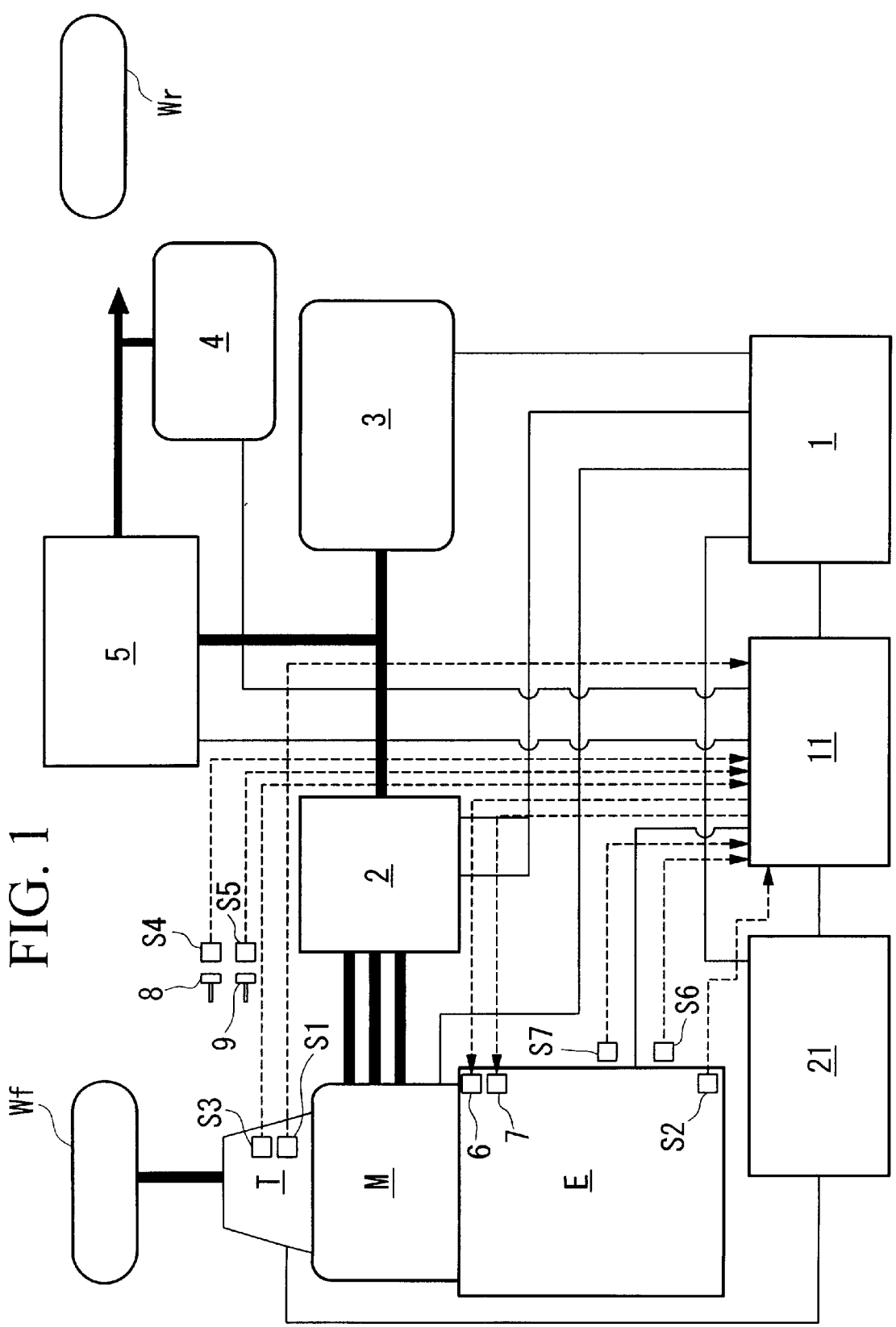
FIG. 1 is a schematic diagram showing the over-all structure of the hybrid vehicle.

FIG. 1 shows an embodiment applied to a parallel hybrid vehicle in which the output axes of the engine and the motor are directly connected and the driving forces from an engine E and a motor M are transmitted through a transmission T, such as an automatic transmission or a manual transmission, to the front wheels Wf and Wf, which are the drive wheels. It is noted that the parallel hybrid vehicle of the present embodiment can be driven by either one of the engine or the motor or by both of the engine and the motor. When the hybrid vehicle decelerates and the driving force is transmitted from the front wheels Wf to the motor M, the motor acts as a generator to generate a regenerative braking force, so that the kinetic energy of the vehicle body is recovered as electric energy.

The driving of the motor M and the regenerative operation by the motor M are conducted by a power drive unit 2 according to control commands from a motor ECU 1. A capacitor 3 for sending and receiving electric energy to and from the motor M is connected to the power drive unit 2, and the capacitor 3 is constituted by, for example, a plurality of modules connected in series, wherein each module is constituted by a plurality of cells composed of electric double layer capacitors connected in series. Hybrid vehicles include a 12 V auxiliary battery 4 for driving various accessories. The auxiliary battery 4 is connected to the capacitor 3 via a downverter 5. The downverter 5, controlled by an FIEDU 11, reduces the voltage from the capacitor 3 and charges the auxiliary battery 4.

The FIECU 11 controls, in addition to the motor ECU 1 and the above-described downverter 5, a fuel supply amount controller 6 for controlling the amount of fuel supplied to the engine E, a starter motor 7, an ignition timing etc. Therefore, the FIECU 11 receives a signal from a speed sensor $S_1$ for detecting the vehicle speed V based on the rotation number of the driving shaft of the transmission, a signal from an engine rotational speed sensor (rotational speed detecting device) $S_2$ for detecting the engine rotational speed NE, a signal from a shift position sensor $S_3$ for detecting the shift position of the transmission T, a signal from a brake switch $S_4$ for detecting the operation of a brake pedal 8, a signal from a clutch switch $S_5$ for detecting the operation of a clutch pedal 9, a signal from a throttle valve opening sensor S$_6$ for detecting the throttle opening state TH, and a signal from an air intake passage pressure sensor S$_7$ for detecting the air intake passage pressure PB. In FIG. 1, reference numeral 21 denotes a CVTECU for controlling a CVT.

Determination of Motor Operation Mode

The control modes of the hybrid vehicle include the "idle mode", "idle stop mode", "deceleration mode", "acceleration mode", and "cruise mode". In the idle mode, the fuel supply is restarted after the fuel cut and the engine E is maintained in the idle state, and in the idle stop mode, the engine is stopped under certain conditions while, for example, the vehicle is stopped. In the deceleration mode, the regenerative braking by the motor M is executed, in the acceleration mode, the engine is assisted by the motor M, and in the cruise mode, the vehicle travels by the engine and the motor M is not driven.

Figure 2:
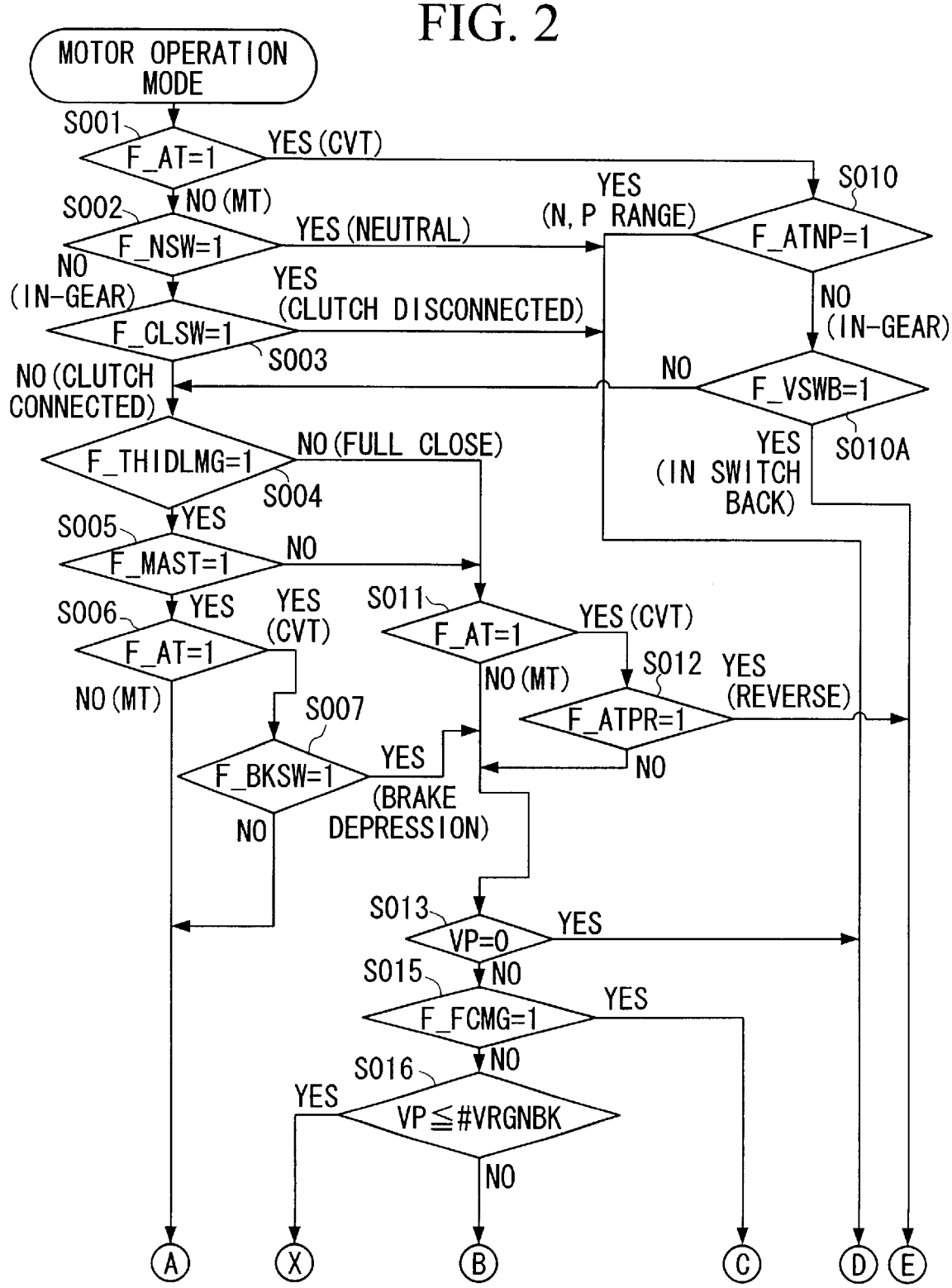
FIG. 2 is a flowchart showing a determination of the motor operation mode.
Figure 3:
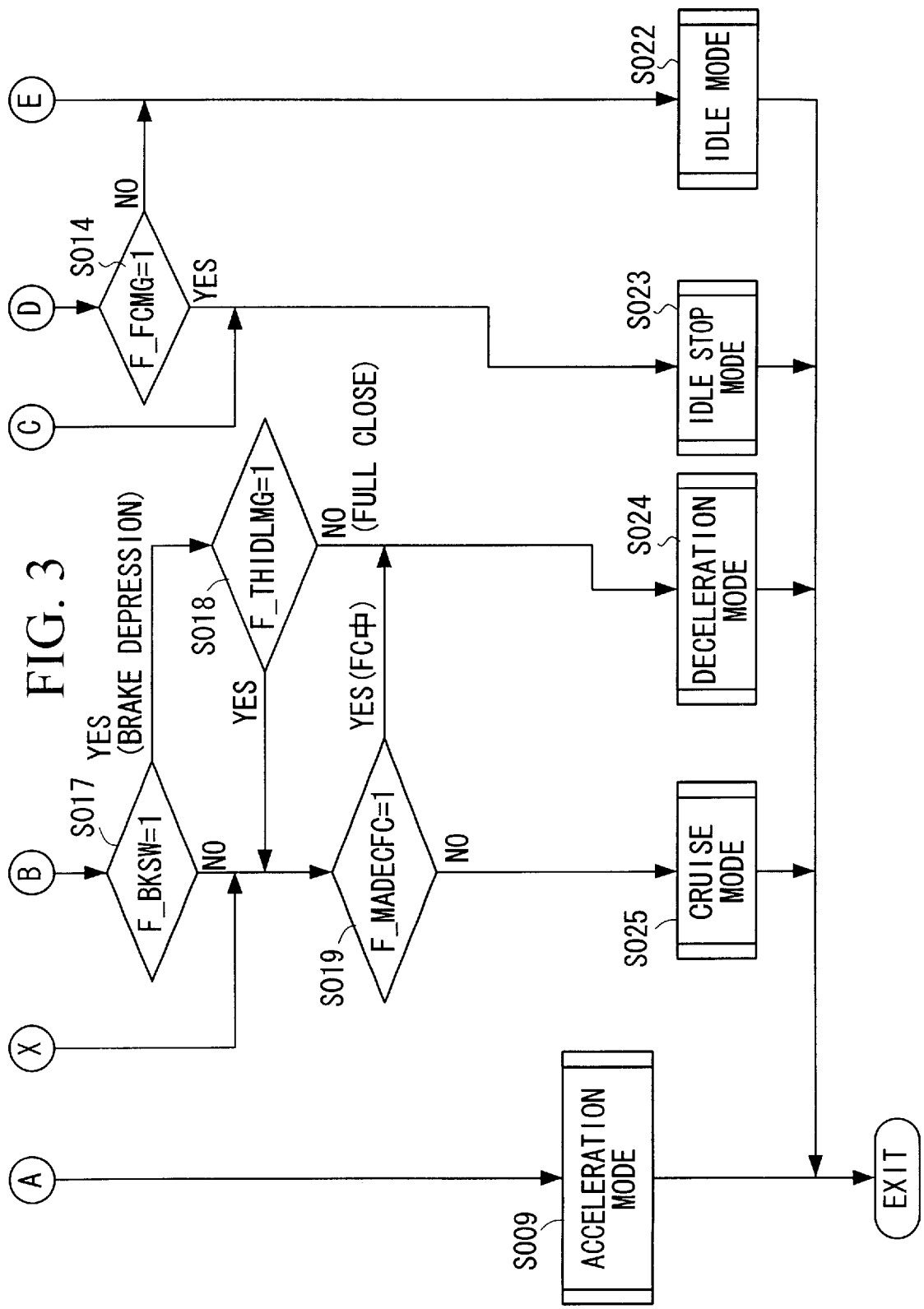
FIG. 3 is a flowchart showing a determination of the motor operation mode.

The process for determining the motor operation mode is described below with reference to FIGS. 2 and 3.

In step S001, it is determined whether the flag value of an MT/CVT determination flag F_AT is "1". If the determination is "NO", that is, if it is determined that the vehicle is an MT vehicle, the flow proceeds to step S002. When the determination in step S001 is "YES", that is, when it is determined that the vehicle is a CVT vehicle, the flow proceeds to step S010, wherein it is determined whether the flag value of a CVT in-gear flag F_ATNP is "1". If the determination in step S010 is "NO", that is, if it is determined that the vehicle is in an in-gear state, the flow proceeds to step S010A, wherein it is determined whether the vehicle is in a switch back operation (operating the shift lever) by determining the state of a switch back flag F_VSWB. When the determination shows that the motor is in switch back operation, the flow proceeds to step S022, wherein the "idle mode" is selected and the program is completed. In the "idle mode", the fuel supply is restarted after the fuel cut, and the engine E is maintained in the idle state. When the determination in step S010A indicates that the vehicle is not in the switch back operation, the flow proceeds to step S004.

In contrast, when the determination in step S010 is "YES", that is, when the transmission is in a position including N (neutral position) or P (parking position), then the flow proceeds to step S014, wherein it is determined whether an engine stop control execution flag F_FCMG is "1". When the result in step S104 is "NO", then the "idle mode" in step S022 is selected and the program is completed. When it is determined that the flag value in step S014 is "1", the flow proceeds to step S023 for selecting the idle stop mode", and the program is completed. In the "idle stop mode" the engine is stopped when certain conditions such as the vehicle stop conditions are fulfilled.

In step S002, it is determined whether the neutral position determination flag F_NSW is "1". When the determination instep S002 is "YES", that is, the gear is in the neutral position, the flow proceeds to step S014. If the result in step S002 is "NO", that is, the gear is in the neutral position, the flow proceeds to step S003, wherein it is determined whether a clutch connection determination flag F_CLSW is "1". When the result is "YES" indicating it is determined that the clutch is in the "disconnected" state, the flow proceeds to step S014. When the determination in step S003 is "NO", showing that the clutch is in the "connected" state, and the flow proceeds to step S004.

In step S004, it is determined whether the IDLE determination flag F_THIDLMG is "1". If the result is "NO", that is, if it is determined that the throttle is fully closed, the flow proceeds to step S011. When the result in step S004 is "YES", that is, when it is determined that the throttle is not fully closed, the flow proceeds to step S005, wherein it is determined whether the motor assist determination flag F_MAST is "1".

If the determination in step S005 is "NO", the flow proceeds to step S011. In contrast, when the determination in step S005 is "YES", the flow proceeds to step S006.

In step S011, it is determined whether the MT/CVT determination flag F_AT is "1". If the result is "NO", that is when it is determined that the vehicle is a MT vehicle, the flow proceeds to step S013. When the determination in step S011 is "YES", that is, when it is determined that the vehicle is a CVT vehicle, the flow proceeds to step S012, wherein, it is determined whether the reverse position determination flag F_ATPR is "1". If the determination is "YES", that is, the vehicle is in the reverse gear, the flow proceeds to step S022. If the determination in step S012 is "NO", that is, when the vehicle is not in the reverse gear, the flow proceeds to step S013.

In step S006, it is determined whether the MT/CVT determination flag F_AT is "1". If the result is "NO", that is, if it is determined that the vehicle is a MT vehicle, the flow proceeds to the "acceleration mode" in step S009.

When the determination in step S006 is "YES", which indicates that the vehicle is a CVT vehicle, the flow proceeds to step S007, wherein it is determined whether the brake ON determination flag F_BKSW is "1". When the determination in step S007 is "YES", indicating that the brake is depressed, the flow proceeds to step S013. When the determination in step S007 is "NO", indicating that the brake is not depressed, the flow proceeds to step S009.

In step S013, it is determined whether the engine control vehicle speed is "0". If the result is "YES", indicating that the vehicle speed is 0, the flow proceeds to step S014. If the determination in step S013 is "NO", indicating that the vehicle speed is not "0", the flow proceeds to step S015. In step S015, it is determined whether the engine stop control execution flag F_FCMG is "1". When the result of the determination in step S015 is "NO", then the flow proceeds to step S016. When the result of the determination in step S015 is "YES", then the flow proceeds to step S023.

In step S016, the control vehicle speed VP is compared with the deceleration mode brake determination lower limit vehicle speed #VRGNBK. It is noted that this deceleration mode brake determination lower limit vehicle speed #VRGNBK has hysteresis.

When it is determined in step S016 that the control vehicle speed VP≦the deceleration mode brake determination lower limit vehicle speed #VRGNBK, the flow proceeds to step S019. In contrast, when it is determined in step S016 that the control vehicle speed VP>the deceleration mode brake determination lower limit vehicle speed #VRGNBK, the flow proceeds to step S017.

In step S017, it is determined whether the brake ON determination flag F_BKSW is "1". When the determination in step S017 is "YES", indicating that the brake is being depressed, the flow proceeds to step S018. When the determination in step S017 is "NO", indicating that the brake is not being depressed, the flow proceeds to step S019.

In step S018, it is determined whether an IDLE determination flag F_THIDLMG is "1". When the determination is "NO", that is, when it is determined that the throttle is fully closed, the flow proceeds to the "deceleration mode", and the program is completed. In the deceleration mode, the deceleration braking by the motor M is performed.

In step S019, it is determined whether a deceleration fuel cut execution flag F_MADECFC is "1". This flag is, as described later, a fuel cut determination flag for executing a fuel cut in a particular mode in the high vehicle speed region.

When the determination in step S019 is "YES", that is, when it is determined that the vehicle is in a deceleration fuel cut state, the flow proceeds to step S024. When the determination in step S019 is "NO", the "cruise mode" is selected in step S025 and the control flow is completed. In this cruise mode, the motor does not drive the vehicle and only the driving force of the engine E drives the vehicle. In some cases, however, the motor is rotated for regeneration or used as a power generator for charging the capacitor 3 according to the driving conditions of the vehicle.

Zoning of Capacitor Charge

Explanations are provided below regarding the zoning of the capacitor charge (also referred to as dividing the capacitor charge into zones), which has a significant effect on the depth-of-discharge limit control, the assist trigger determination, and the cruise mode. Calculation of the state of charge of the capacitor is conducted by measuring the capacitor voltage by the motor ECU 1.

Explanations are provided below regarding the zoning of the capacitor charge (also referred to as dividing the capacitor charge into zones), which have a significant effect on the assist trigger determination or the cruise mode. In contrast to a battery, the state of charge of the capacitor can be obtained from the capacitor voltage, since the state of charge of the capacitor is proportional to square of the capacitor voltage.

An example of zoning of the capacitor charge is shown below. First, zone A (the state of charge in a range of 40% to 80 or 90%) is defined as the standard operation range of the state of charge, and below the zone A, a provisional operation zone B (the state of charge of 20% to 40%) and further below the zone B, an over discharge zone C (the state of charge of 0% to 20%) are defined. Above the zone A, an overcharge zone D (the state of charge of 80 to 90% to 100%) is defined.

Below, the depth-of-discharge limit control, and the assist trigger determination and the cruise mode are explained in sequence.

Depth of Discharge Limit Determination

Figure 4:
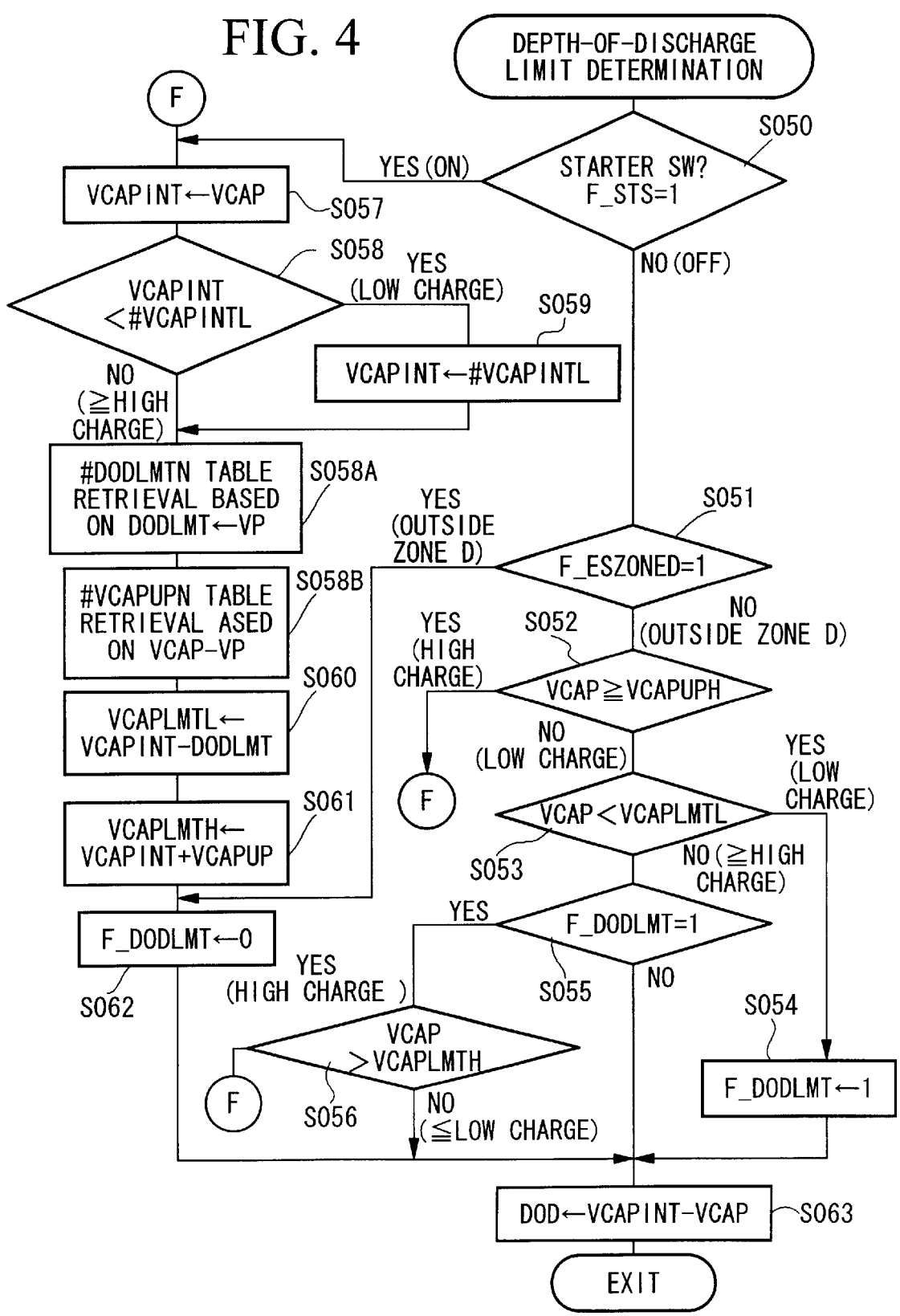
FIG. 4 is a flowchart showing the discharge depth limit determination.

FIG. 4 shows a flowchart for conducting the depth-of-discharge limit determination.

First, in step S050, it is determined whether a start switch determination flag F_STS is "1", that is, whether it is the starting time in the first run. When the determination is "1", that is, when it is determined that this is the first run, the flow proceeds to steo S057, wherein the initial value VCAPINT of the capacitor voltage VCAP is read when the vehicle starts running. Subsequently, in step S058, it is determined whether the initial value VCAPINT of the capacitor voltage VCAP is lower than the depth-of-discharge limit initial lower limit value #VCAPINTL. Here, the state of charge of the capacitor corresponding to the depth-of-discharge limit initial lower limit value #VCAPINTL is, for example, 50%.

When the determination in step S058 is "YES", indicating that the initial value VCAPINT of the capacitor voltage VCAP<the depth-of-discharge limit initial lower limit value #VCAPINTL (that is, low voltage and low state of charge), the flow proceeds to step S059, wherein the initial value VCAPINT of the capacitor voltage VCAP is set at the depth-of-discharge limit initial lower limit value #VCAPINTL, and the flow proceeds to step S058A. That is, when the depth-of-discharge limit initial lower limit value #VCAPINTL is set at 140V, which indicates that the state of charge is 50%, and if the capacitor voltage VCAP is below 140V, the initial value VCAPINT of the capacitor voltage VCAP is set at 140V.

In contrast, when the determination in step S058 is "NO", that is, when the initial value VCAPINT of the capacitor voltage VCAP≧the depth-of-discharge limit initial lower limit value #VCAPINTL (that is, high voltage and high state of discharge), the flow also proceeds to step S58A.

Figure 5:
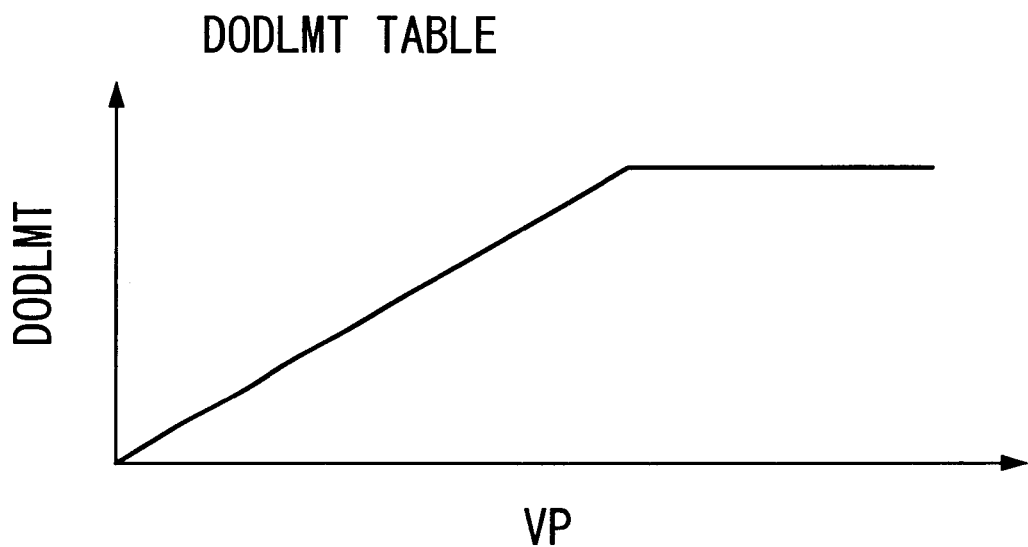
FIG. 5 is a graph showing the DODLMT table.

In step S058A, a depth-of-discharge limit control value DODLMT according to the control vehicle speed VP is retrieved referring to a #DODLMTL table shown in FIG. 5. As shown in FIG. 5, the depth-of-discharge limit control value DODLMT increases with the increase of the control vehicle speed VP in a certain speed range.

When the control speed is in a higher range, it is possible to recover energy by regeneration due to a higher motor rotation rate. Therefore, even if the depth-of-discharge limit value DODLMT is set at a high value, it is possible to recover the state of charge of the capacitor, because it is possible to recover the amount of charge corresponding to the increase of the capacitor voltage VCAP from the lower limit threshold value VCAPLMTL to the upper limit threshold value VCAPLMTH, both of which are described later.

In contrast, when the control vehicle speed is low, the recharge energy obtained by the rotation of the motor is low. Therefore, the depth-of-discharge limit value DODLMT is set at a smaller value so as to facilitate the recovery of the remaining charge, which corresponds to the increase of the capacitor voltage from the lower limit threshold value VCAPLMTL to the upper limit threshold value VCAPLMTH, both of which are described later. In addition, the charging frequency of the capacitor is increased so as to decrease the incidence of engine stops, that is, to reduce the likelihood of the engine stop.

Figure 6:
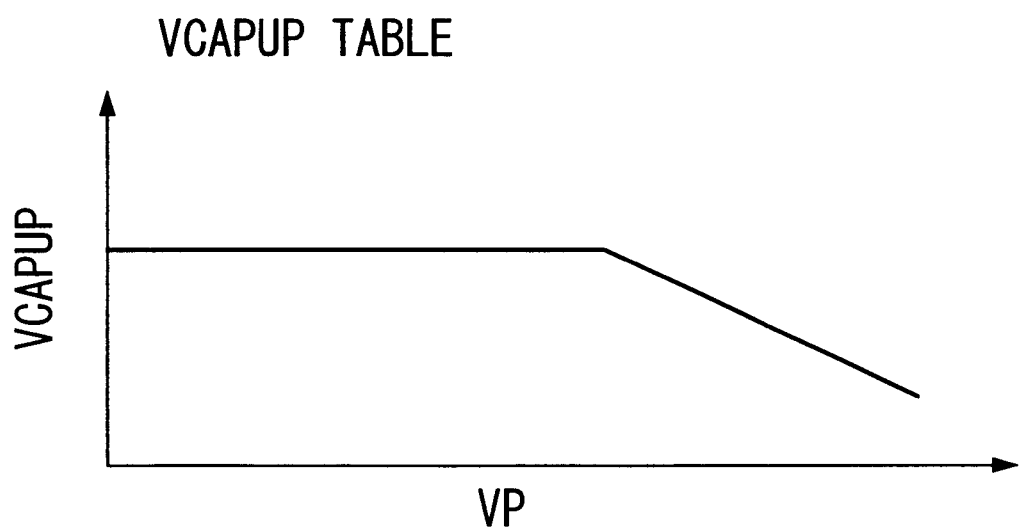
FIG. 6 is a graph showing the VCAPUP table.

In step S058B, the depth-of-discharge limit release voltage increase value VCAPUP is obtained by table retrieval from the #VCAPUPN table shown in FIG. 6. As shown in the table shown in FIG. 6, when the vehicle speed increases to a certain higher range, the depth-of-discharge limit release voltage increase value VCAPUP is set to increase with the increase of the vehicle speed VP.

In the case of a high vehicle speed, since the regenerative energy is large because of the high vehicle speed, the depth-of-discharge limit value release voltage increase value VCAPUP is set at a small value so as not to raise the depth-of-discharge limit value release voltage increase value #VCAPUP more than necessary.

In contrast, in the case of a high vehicle speed, since the regenerative energy is small because of the high vehicle speed, the depth-of-discharge limit value release voltage increase value VCAPUP is set to a large value such that the depth-of-discharge limit value release voltage increase value #VCAPUP increases for assisting the recovery of the remaining charge.

As described above, since the depth-of-discharge limit value DODLMT and the depth-of-discharge limit value release voltage increase value VCAPUP are changed according to the vehicle speed, it is possible to preserve the remaining capacity of the capacitor, to improve the fuel efficiency by eliminating unnecessary charging of the capacitor, and to execute optimum depth-of-discharge control.

In step S060, the lower limit threshold value VCAPLMTL is set based on the initial value VCAPINT of the capacitor voltage VCAP and the upper limit threshold value VCAPLMTH is set in step S0601.

As described above, when the initail value VCAPINT of the capacitor voltage VCAP is lower than the depth-of-discharge limit initial lower limit value 3VCAPINTL, the initial value of the capacitor voltage VCAP is set to the depth-of-discharge limit initial lower limit value #VCAPINTL so that the depth-of-discharge can be reduced to the lower limit threshold value by raising the initial value.

Accordingly, when the remaining charge at the time of starting the engine is low, and the initial value VCAPINT of the capacitor voltage is low, that is, when the initial value VCAPINT is lower than the depth-of-discharge limit initial lower limit value #VCAPINTL, the remaining charge of the capacitor can be recovered by shortening the time to enter into the depth-of-discharge control or by starting the depth-of-discharge control simultaneously with the start of the vehicle, when the initial value of the capacitor voltage is in a certain low range.

Subsequently, in step S062, the previous COD limit determination flag F_DODLMT is set to "0" for releasing the previous setting of the depth-of-discharge limit control mode, and the flow proceeds to step S063. In step S063, the difference between the present value of the capacitor voltage VCAP and the initial value VCAPINT, that is, the depth-of-discharge indicating the amount of discharge DOD, is obtained and the program is completed. That is, the depth-of-discharge DOD can be obtained irrespective of the flag value of the DOD limit determination flag F_DODLMT.

When the vehicle is started and when it is determined that the start switch determination flag F_STS is "0", it is determined whether the energy storage zone D determination flag is "1" in step S051 and the flow proceeds to step S052 when the determination in step S051 is "NO". When the determination in step S051 is "YES", indicating that the present remaining charge is in the zone D, the flow proceeds to step S062. In step S052, it is determined whether the present capacitor voltage VCAP is higher than the depth-of-discharge limit execution upper limit value VCAPUPH. When the determination is "YES", that is, when it is determined that the present capacitor voltage VCAP≧the depth-of-discharge limit execution upper limit value VCAPUPH, indicating that the present capacitor voltage VCAP is equal to or higher than the depth-of-discharge limit execution upper limit value VCAPUPH (that is, the capacitor voltage is high and the remaining charge is high). The flow proceeds to step S057. When the determination in step S052 is "NO", indicating that the present capacitor voltage VCAP<the depth-of-discharge limit execution upper limit value VCAPUPH (that is, the capacitor voltage is low and the remaining capacitor charge is low), the flow proceeds to step S053. The actual value for the above depth-of-discharge limit execution upper limit value VCAPUPH is set, for example, to 70%.

Subsequently, in step S053, it is determined whether the capacitor voltage VCAP is lower than the above-described lower limit threshold value VCAPLMTL. When the determination is "YES", that is, when it is determined that the capacitor voltage VCAP<the lower limit VCAPLMTL (that is, the capacitor voltage is low, and the remaining charge is low), the DOD limit determination flag F_DODLMT is set to "1" for setting the depth-of-discharge limit control mode, and the flow proceeds to step S063. Thereby, the state of the vehicle is controlled in accordance with the DOD limit determination flag F_DODLMT in the assist trigger mode and the cruise mode which are described later.

Here, when the vehicle enters in the depth-of-discharge limit control mode, power charge is carried out so as to increase the remaining charge of the capacitor. In step S053, when it is determined that the capacitor voltage VCAP≧the lower limit threshold value VCAPLMTL, that is, the capacitor voltage VCAP is equal to or higher than the lower limit threshold value VCAPLMTL (that is, the capacitor voltage is high and the remaining capacitor charge is high), it is determined in step S055 the state of the DOD limit determination flag F_DODLMT is determined.

When the determination in step S055 is "YES", that is, when it is determined that the depth-of-discharge limit control is set, then it is determined in step S056 whether the capacitor voltage VCAP>the upper limit threshold value VCAPLMTH, When it is determined in step S056 that the capacitor voltage VCAP>the upper limit threshold value VCAPLMTH, that is, the capacitor voltage VCAP is higher than the upper limit threshold value VCAPLMTH (that is, the capacitor voltage is high and the remaining capacitor charge is high), the flow proceeds to step S057, wherein the initial value VCAPINT of the capacitor voltage VCAP, and following the capacitor voltage, the upper limit threshold value VCAPLMTH and the lower limit threshold value VCAPLMTL are updated. The increase of the capacitor voltage according to the update continues until the remaining capacitor charge enters in the zone D. Thereby, it is possible to recover the remaining capacitor charge rapidly and to prevent excess charging of the capacitor.

When it is determined in step S055 that the DOD limit determination flag F_DODLMT is "0", indicating that the depth-of-discharge limit control mode is released, or when it is determined in step S056 that the capacitor voltage VCAP≦the upper limit threshold value VCAPLMTH, indicating that the capacitor voltage VCAP is equal to or lower than the upper limit threshold value VCAPLMTH (that is, the capacitor voltage is low and the remaining capacitor charge is low), the flow proceeds to step S063.

Next, the depth-of-discharge limit control mode is explained below concretely.

The depth-of-discharge limit control mode is a control mode for increasing the remaining capacitor charge when the remaining capacitor charge is liable to decrease and the remaining capacitor charge reaches the above-described lower limit threshold value VCAPLMTL. Accordingly, in order to make the vehicle charge the capacitor, the control device control the frequency of acceleration to be decreased and the frequency of charging in the cruise mode is increased in this mode by raising an assist trigger threshold. Below, the assist trigger mode will be described.

Figure 7:
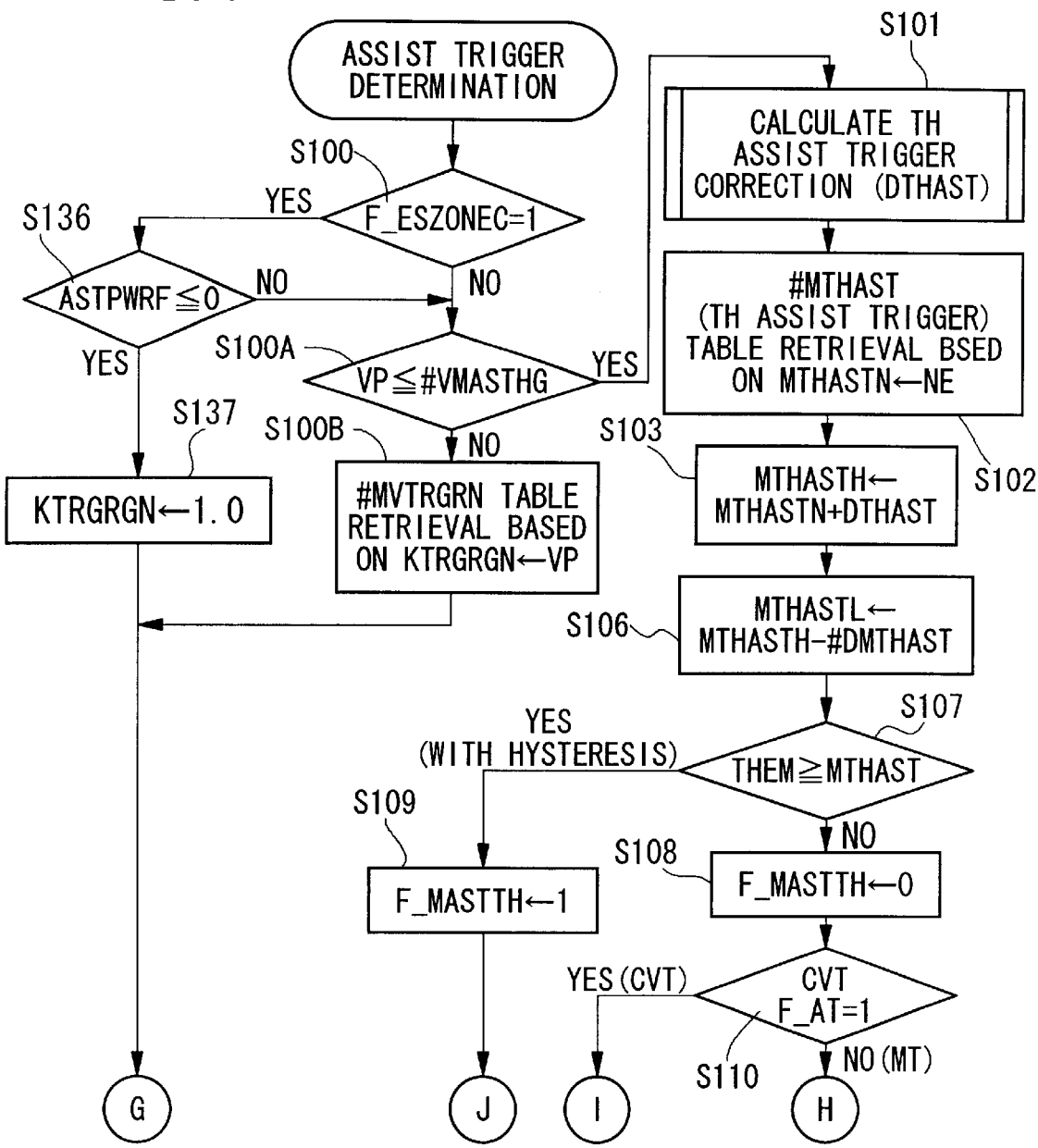
FIG. 7 is a flowchart showing the assist trigger determination.
Figure 8:
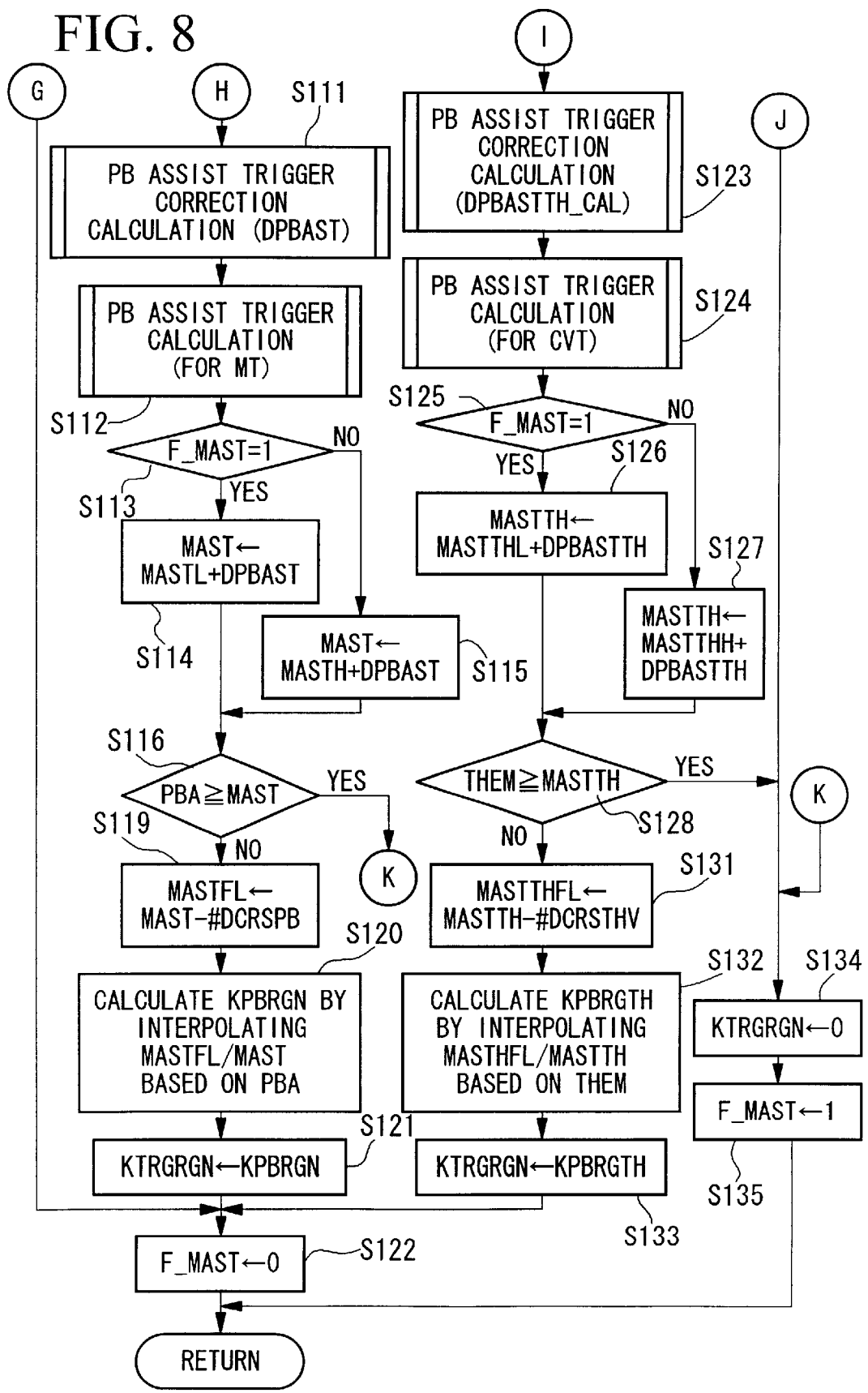
FIG. 8 is a flowchart showing the assist trigger determination.
Figure 9:
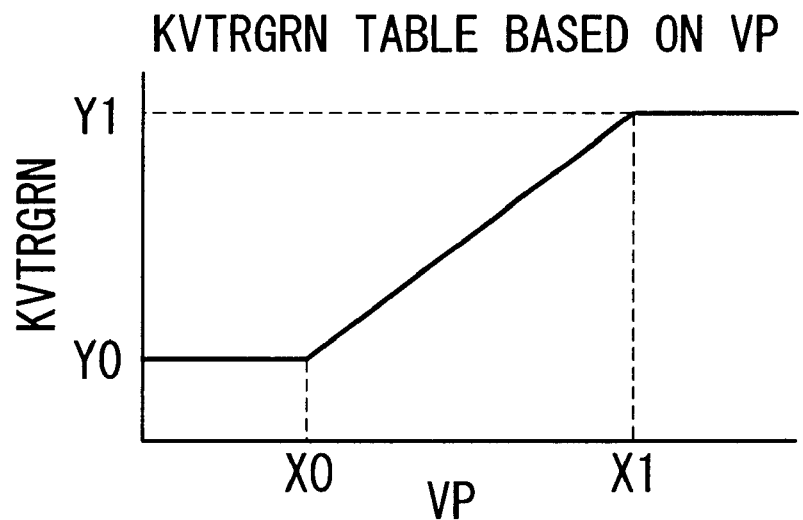
FIG. 9 is a graph showing the cruise charge amount correction coefficient in a high vehicle speed range.

Assist Trigger Determination FIGS. 7 and 8 show flowcharts of the assist trigger determination, and in more detail, show flowcharts for determining the acceleration/cruise modes from the regions.

In step S100, it is determined whether the energy storage zone C flag F_ESZONEC is "1". When the determination is "YES", indicating that the remaining capacitor charge is within zone C, it is determined in step S136, whether the final assist command value ASTPWRF is less than "0". When the determination in step S136 is "YES", indicating that the final assist command value ASTPWRF is less than "0", then, in step S137, the cruise charge amount subtraction coefficient KTRGRGN is set to "1.0" and the flow returns.

When the determination in step S100 and the determination in step S136 are "NO", the flow proceeds to step S100A. In step S100A, the control vehicle speed VP is compared with the assist trigger retrieval upper limit vehicle speed #VMASTHG. It is noted that this value #VMASTHG has hysteresis.

When it is determined in step S100A that the control vehicle speed VP is less than the assist trigger retrieval upper limit vehicle speed #VMASTHG, the flow proceeds to step S102. Here, the assist trigger retrieval upper limit vehicle speed #VMASTHG is, for example, 170 km.

When it is determined in step S100A that the control vehicle speed VP is larger than the assist trigger retrieval upper limit vehicle speed #VMASTHG, the flow proceeds to step S100B, wherein, based on the control vehicle speed VP, a cruise charging correction coefficient KTRGRGN is retrieved referring to the #KVTRGRN table. The flow then proceeds to step S122.

Accordingly, when the determination in step S100A indicates that the vehicle speed VP is higher than the assist trigger retrieval upper limit vehicle speed #VMASTHG, the assist trigger retrieval is not conducted so that the vehicle does not enter into the acceleration mode.

Subsequently, in step S101, a throttle assist trigger correction value DTHAST is calculated. This processing is described in a later section.

In step S102, a threshold value MTHASTN, which constitutes a standard for the throttle assist trigger, is retrieved referring to a #MTHAST throttle (assist trigger) table. As shown by the solid line in FIG. 11, this #MTHAST throttle (assist trigger) table defines the threshold values MTHASTN of the throttle opening state depending on the engine rotational speed NE. The threshold value MTHASTN is the standard for the determination of whether the motor assist is executed. That is, the threshold values are defined in accordance with the engine rotational speed NE.

Subsequently, in steps S103, an upper throttle assist trigger threshold value MTHASTH is obtained by addition of a throttle assist trigger correction value DTHAST to the standard threshold value of the throttle assist trigger MTHASTN, and in step S106, a lower assist trigger assist trigger threshold MTHASTL is obtained for setting hysteresis by subtracting a difference #DMTHAST from the high throttle assist trigger threshold value MTHASTH. These upper and lower throttle assist trigger threshold values are shown with the dashed lines in FIG. 11, overlapping with the standard threshold value MTHASTN of the throttle assist trigger table. The flow then proceeds to step S107.

In step S107, it is determined whether the present value THEM indicating the opening state of throttle is equal to or above the throttle assist trigger threshold value MTHAST. In this case, the throttle assist trigger threshold value MTHAST, which includes the hysteresis mentioned above, refers to the upper throttle assist trigger threshold value MTHASTH when the opening of the throttle is increased, and refers to the lower throttle assist trigger threshold value MTHASTL when the opening of the throttle is decreased.

When the determination in step S107 is "YES", that is, when the present value THEM of the opening of the throttle is equal to or above the throttle assist trigger threshold value MTHAST (which includes hysteresis having the upper and lower values), the flow proceeds to step S109. When the determination in step S107 is "NO", that is, when the present value THEM of the opening of the throttle is not equal to or above the throttle assist trigger threshold value THEM of the throttle assist trigger threshold value MTHAST (which includes hysteresis having the upper and lower values), the flow proceeds to step S108.

In step S109, the throttle motor assist determination flag F_MASTTH is set to "1". In step S108, the throttle motor assist determination flag F_MASTTH is set to "0", and the flow proceeds to step S110.

In the above process, it is determined whether the throttle opening state TH requires the motor assist. When it is determined in step S107 that the present value THEM of the opening of the throttle is equal to or above the throttle assist trigger threshold value MTHAST, the throttle motor assist determination flag F_MASTTH is set to "1", and it is determined that the motor assist is required by reading the throttle motor assist determination flag in the "acceleration mode" mentioned above.

In contrast, in step S108, when the throttle motor assist determination flag F_MASTTH is set to "0", it is determined that the motor assist determination cannot be made by the opening of the throttle. As described above, the assist trigger determination is made in the present embodiment by the throttle opening state TH or by the air intake passage pressure PB. When the present value THEM of the opening of the throttle is equal to or above the throttle assist trigger threshold value MTHAST, the assist determination is made based on the throttle opening state TH, and when the present value THEM does not exceed the throttle assist trigger threshold value MTHAST, the determination is made based on the air intake passage pressure PB.

Subsequently, in step S109, after the throttle motor assist determination flag F_MASTTH is set to "1", the flow proceeds to step S134, for exiting the normal assist determination flow. In step S134, the cruise charge amount subtraction coefficient KTRGRGN is set to "0", and in the subsequent step S135, the motor assist determination flag F_MAST is set to "1" and the flow returns.

In step S110, it is determined whether the MT/CVT determination flag F_AT is "1". When the determination is "NO", that is, when it is determined that the vehicle is a MT vehicle, the flow proceeds to step S112. When the determination in step S110 is "YES" indicating that the vehicle is a CVT vehicle, the flow proceeds to step S123. In step S111, the air intake passage pressure assist trigger correction value DPBAST is calculated. This process is described in a later section. Subsequently, in step S112, an air intake passage pressure assist trigger for the MT vehicle is calculated. This process is also described in the later section.

Next, in the subsequent step S113, it is determined whether the motor assist determination flag F_MAST is "1". When the determination is "1", the flow proceeds to step S114, and when the determination is not "1", then the flow proceeds to step S115. In step S115, the air intake passage pressure assist trigger threshold value MAST is obtained by addition of the correction value DPBAST, calculated in step S111, to the lower threshold value MASTL of the air intake passage pressure assist trigger, obtained by retrieval in step S112. In step S116, it is determined whether the present value PBA of the air intake passage pressure is equal to or more than the air intake passage pressure assist trigger threshold value MAST. When the determination is "YES", the flow proceeds to step S134, and when the determination is "NO", the flow proceeds to step S119. In step S115, the air intake passage pressure assist trigger threshold value MAST is obtained by addition of the correction value DPBAST, calculated in step S111, to the higher threshold value MASTH of the air intake passage pressure assist trigger. The flow proceeds then to step S116.

Figure 10:
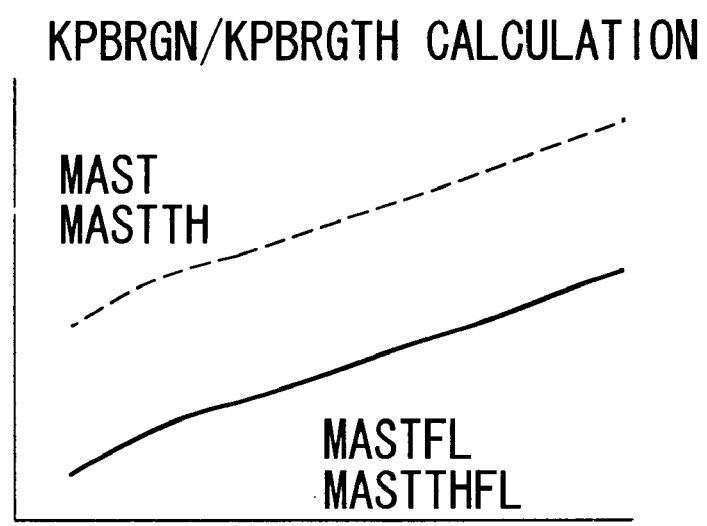
FIG. 10 shows a graph for obtaining numeral values in steps S119 and S131.

Next in step S119, a lower limit threshold value MASTFL of the final air intake passage pressure assist trigger is obtained by subtracting a predetermined delta value #DCR-SPB (for example, 100 mmHg) of the air intake passage pressure from the above-described air intake passage pressure assist trigger threshold value MAST, shown in FIG. 10. Subsequently, in S120, a final cruise charge amount subtraction coefficient table value KPBRGN is obtained by interpolating the final air intake passage pressure assist trigger threshold value MASTFL and the air intake passage pressure assist trigger threshold value MAST using the present value PBA of the air intake passage pressure, and in step S121, the cruise charge amount subtraction coefficient KTRGRGN is set to the table value KPBRGN of the cruise charge amount subtraction coefficient. Then, in step S122, the motor assist determination flag F_MAST is set to "0" and the program returns.

In the above-described step S123, the air intake passage pressure assist trigger correction value DPBASTTH is calculated. This calculation processing will be described later.

Subsequently, in step S125, it is determined whether the motor assist determination flag F_MAST is "1". When the determination is "1", the flow proceeds to step S126, and when the determination is not "1", the flow proceeds to step S127. In step S126, the air intake passage pressure assist trigger threshold value MASTTH is obtained by addition of the correction value DPBSTTH, calculated in step S123 to the lower threshold value MASTTHL of the air intake passage pressure assist trigger, obtained in step S124. Subsequently, in step S128, it is determined whether the present value of the throttle opening state THEM is equal to or higher than the air intake passage pressure assist trigger threshold value MASTTH. When the determination is "YES", the flow proceeds to step S131. Instep S131, the high threshold value MASTTHH of the air intake passage pressure assist trigger and the correction value DPBASTTH are added to the air intake passage pressure assist trigger threshold value MASTTH, and the flow proceeds to step S128.

Subsequently, in step S131, a final air intake passage pressure assist trigger lower limit threshold value MASTTHFL is obtained by subtracting the predetermined delta value #DCRSTHV from the above-described air intake passage pressure assist trigger threshold value MASTTH. Subsequently, in step S132, the cruise charge amount subtraction coefficient table value KPBRGTH is calculated by interpolation of the final air intake pressure assist trigger lower limit threshold value MASTTHFL and the air intake pressure assist trigger threshold value MASTTH using the present value THEM of the throttle opening state. In step S133, the cruise charge amount subtraction coefficient KTRGGN is set to the cruise charge amount subtraction coefficient table value KPBRGRH. Subsequently, in step S122, the motor assist determination flag F_MAST is set to "0", and the flow returns.

TH Assist Trigger Correction

Figure 13:
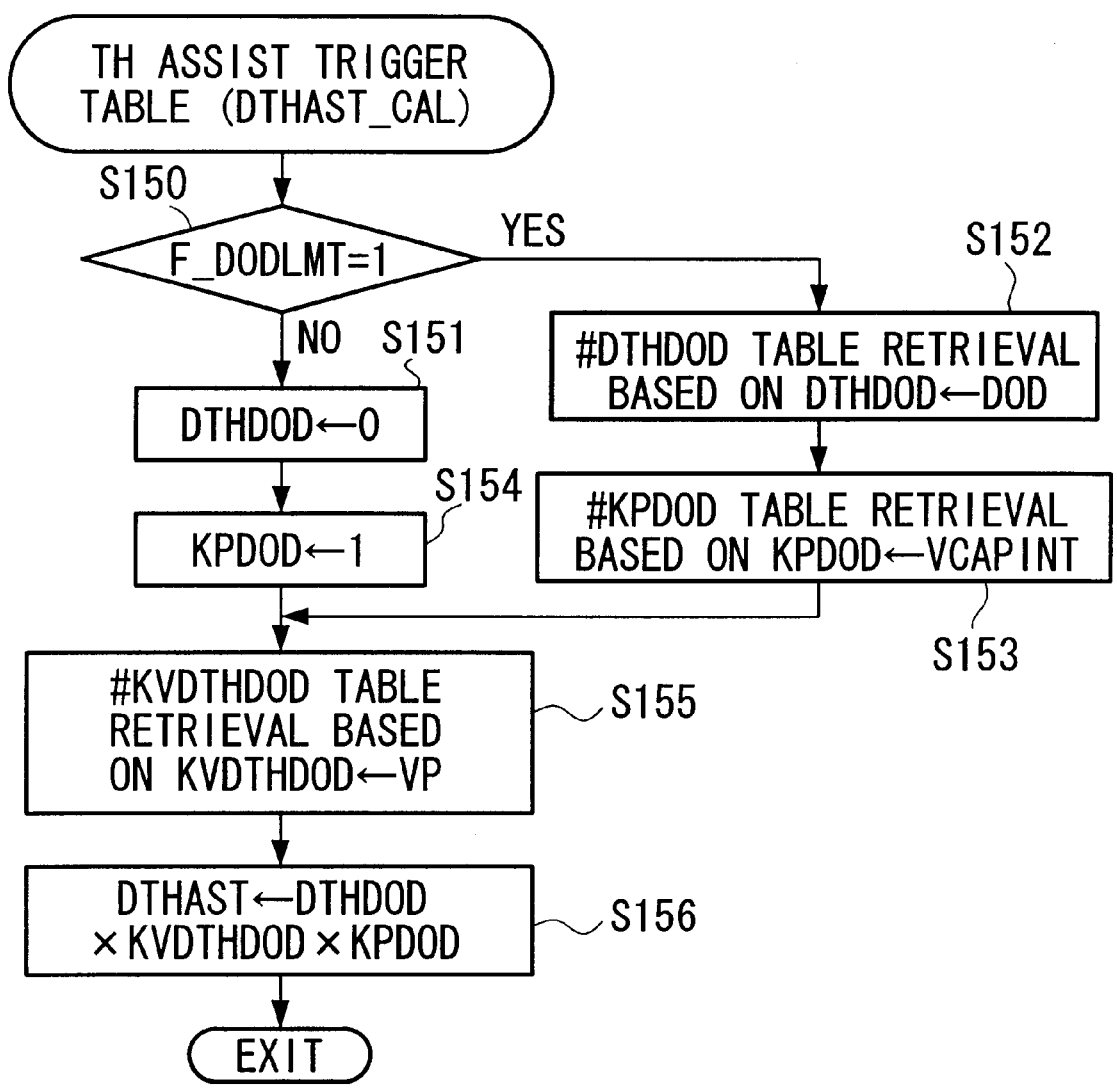
FIG. 13 is a flowchart showing the TH assist trigger correction.
Figure 14:
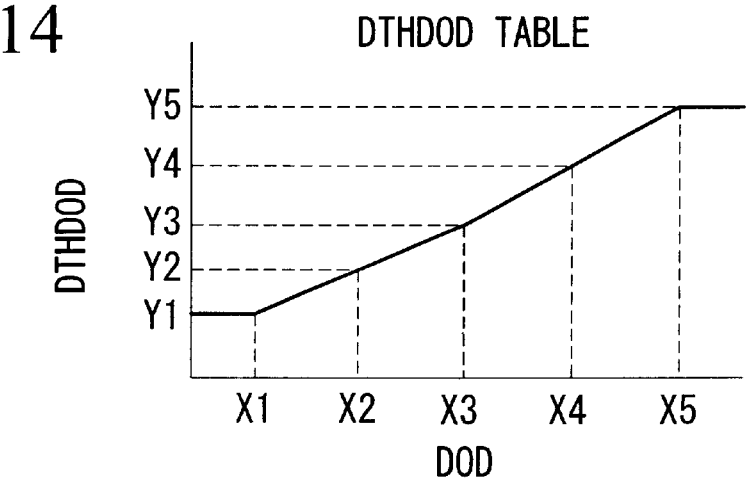
FIG. 14 is a graphic diagram showing the correction table in response to DOD of the depth-of-discharge limit control.

FIG. 13 is a flowchart showing the throttle assist trigger correction executed in the above-described step S101.

Figure 15:
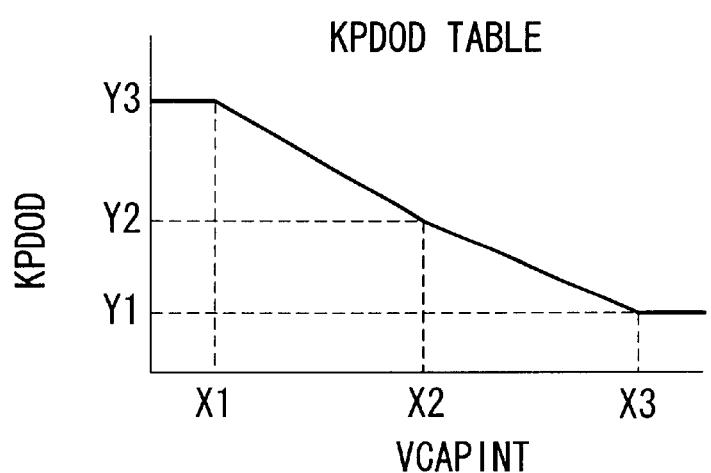
FIG. 15 is a graphical diagram showing the correction coefficient corresponding to the initial state of charge of the capacitor.

In step 150, it is determined whether the limit control of the depth-of-discharge DOD of the capacitor is performed by determining whether the above-described DOD limit determination flag F_DODLMT is "1". When it is determined that the vehicle is in the depth-of-discharge limit control mode, a DOD limit control mode correction value #DTHDOD is table retrieved and the DOD limit control mode correction value DTHDOD is set to the value of #DTHDOD. Subsequently, in step S153, the DOD limit control mode voltage correction value #KPDOD is table retrieved referring to the table shown in FIG. 15 using the initial value VCAPINT of the capacitor voltage VCAP, and the obtained value is substituted for the DOD limit control mode voltage correction value KPDOD, and the flow the proceeds to step S155.

In contrast, when it is determined in step S150 that the depth-of-discharge limit control mode is released, the flow proceeds to step S151, wherein the DOD limit control mode correction value DTHDOD is set to "0". IN the subsequent step S154, the DOD limit control mode voltage correction value KPDOD is set to "1", and the flow proceeds to step S155.

A positive value is assigned to the above-described predetermined value #DTHDOD so as to raise the determination value for the motor assists, and so as to reduce the frequency of the motor assist when the vehicle is in the depth-of-discharge limit control mode. Thus, when the vehicle is in the depth-of-discharge limit control mode, it is possible to reduce the frequency of the motor assist, so that the remaining capacitor charge can be recovered rapidly.

Figure 16:
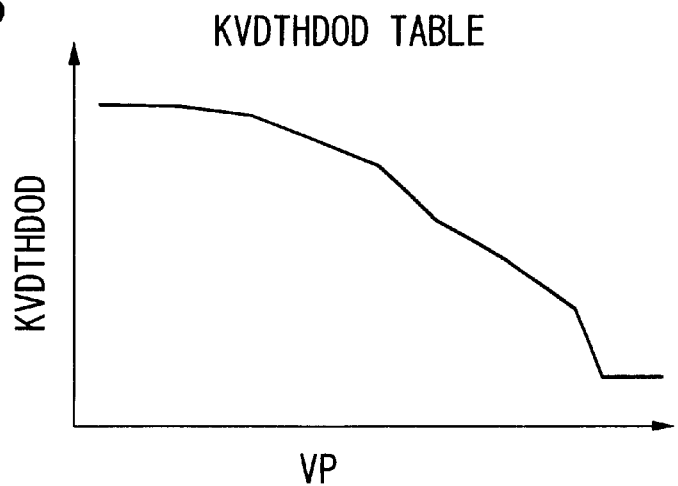
FIG. 16 is a graphical diagram showing the correction coefficient in accordance with the vehicle speed.

Subsequently, in step S155, a throttle assist trigger DOD correction value vehicle speed correction coefficient KVDTHDOD in response to the vehicle speed VP is table retrieved referring the table shown in FIG. 16. It is noted that the throttle assist trigger DOD correction value vehicle speed correction coefficient KVDTHDOD decreases as the vehicle speed increases.

Subsequently, in step S156, the throttle assist trigger correction value DTHAST is obtained based on the DOD limit control mode correction value KPDOD obtained in steps S151 or S152, the DOD limit control mode voltage correction value KPDOD obtained in step S153, and the throttle assist trigger DOD correction value vehicle speed correction coefficient KVDTHDOD obtained in step S154.

Here, when the vehicle is in the DOD limit control mode, the assist trigger threshold value is raised by the DOD limit control mode correction value KPDOD obtained in step S152, or the throttle assist trigger DOD correction value vehicle speed correction coefficient KVDTHDOD obtained in step S155. However, when the remaining capacitor charge is sufficiently high, the increase of the amount of the assist trigger threshold value can be made small by the DOD limit control mode voltage correction value KPDOD obtained in step S153, and it is possible to prevent the difficulties in entering the acceleration mode even when the remaining capacitor charge is high. That is, since it is possible to decrease the amount of increase the assist trigger threshold value when the initial value VCAPINT of the capacitor voltage VCAP is higher than the case of a low capacitor voltage, ease of entry of the vehicle into the acceleration mode is not uniform. When the initial value VCAPINT of the capacitor voltage is higher the case of lower voltage, it easier for the vehicle to enter the acceleration mode, which results in improving the drivability for the driver.

PB Assist Trigger Correction (MT)

Figure 17:
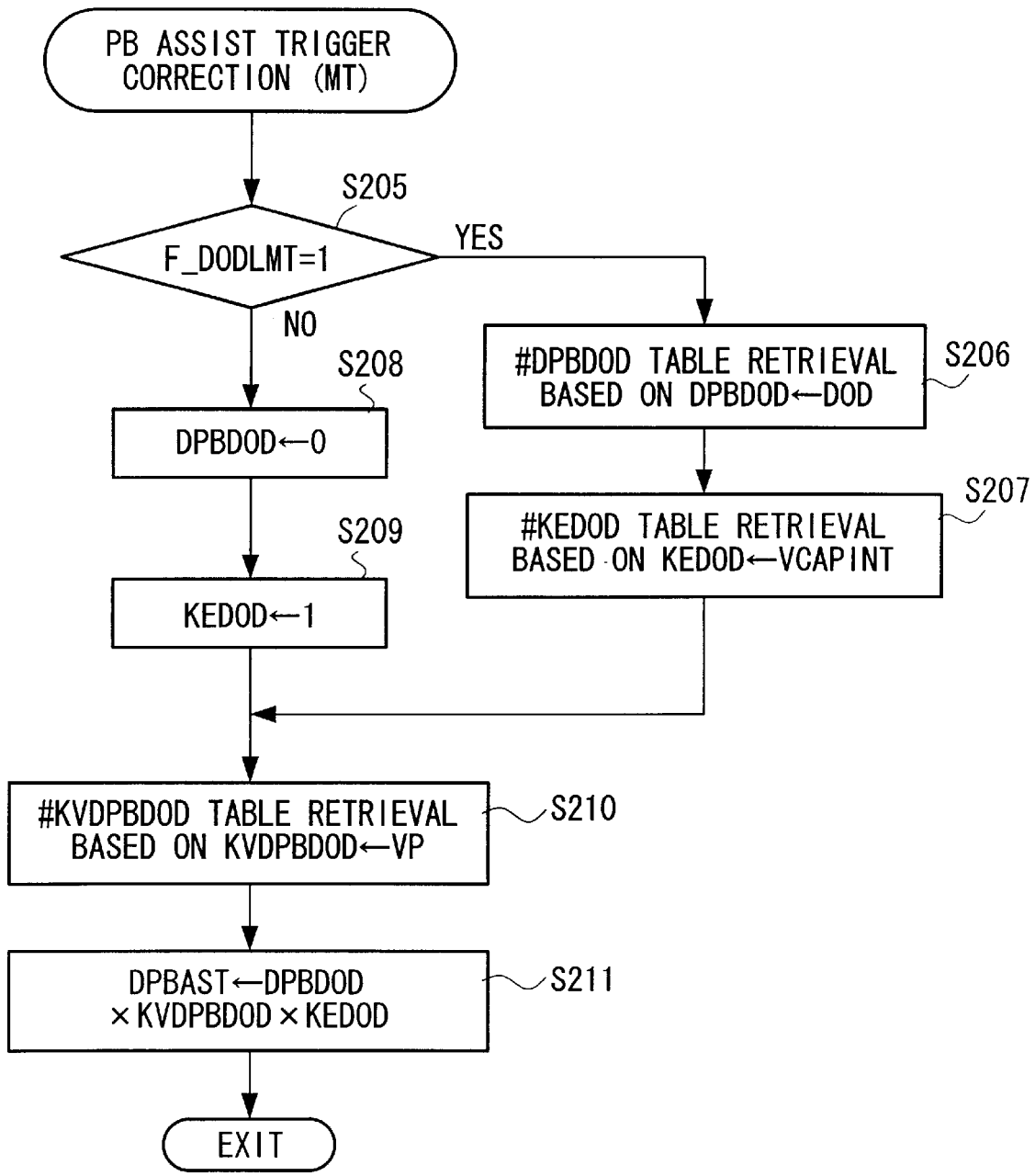
FIG. 17 is a flowchart showing the PB assist trigger correction (for MT vehicle).
Figure 18:
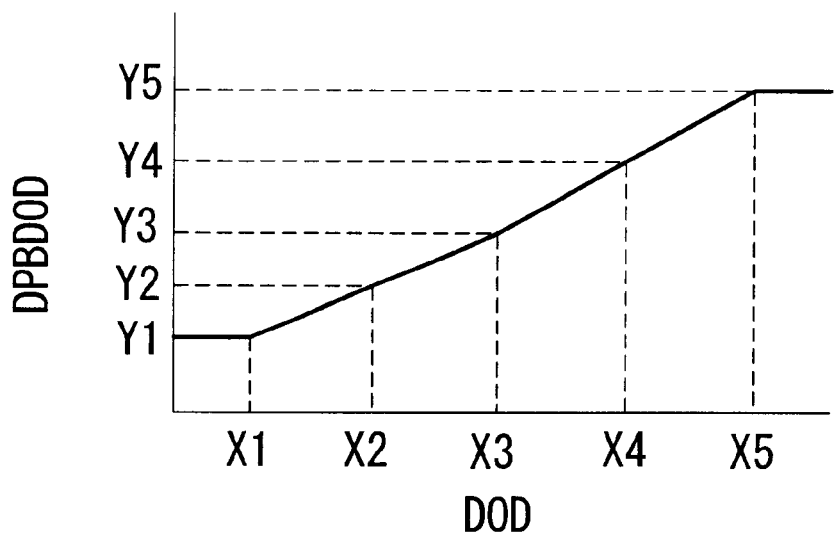
FIG. 18 is a graph showing the correction table of the depth-of-discharge limit control.

FIG. 17 is a flow-chart showing the suction pipe negative pressure throttle assist trigger correction in the above-described step S111.

Figure 19:
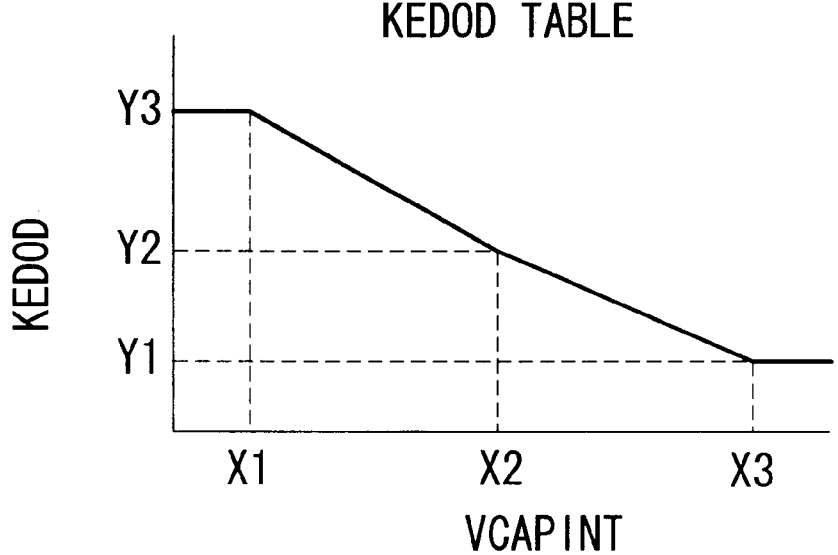
FIG. 19 is a graph showing the correction table corresponding to the initial state of charge of the capacitor.

In step S205, it is determined whether the vehicle is in the limit control mode for the depth-of-discharge DOD by determining whether the DOD limit determintion flag F_DODLMT is "1". When the vehicle is in the depth-of-discharge limit control mode, the flow proceeds to step S206, wherein the DOD limit control mode correction value DPBDOD is table retrieved referring to the table shown in FIG. 19, and the DOD limit control mode voltage correction value KEDOD is set to this retrieved value, and the flow proceeds to step S210.

Subsequently, in step S205, when the depth-of-discharge is released, the flow proceeds to the subsequent step S208, wherein DOD limit control mode correction value DPBDOD is set to "0", and the flow proceeds to step S209.

In this case, the predetermined value #DPBDOD is set to a positive value in order to raise the judgement value for the motor assist, and when the vehicle is in the depth-of-discharge depth limit control mode, the predetermined positive value corrects the vehicle so as to reduce the frequency of motor assists. Accordingly, since it is possible to reduce the frequency of entery into the motor assist when the vehicle is in the depth-of-discharge limit control mode, the remaining capacitor charge can be recovered rapidly.

Subsequently, in step S209, the DOD limit control mode voltage correction value KEDOD is set to "1", and the flow proceeds to step S210.

Figure 21:
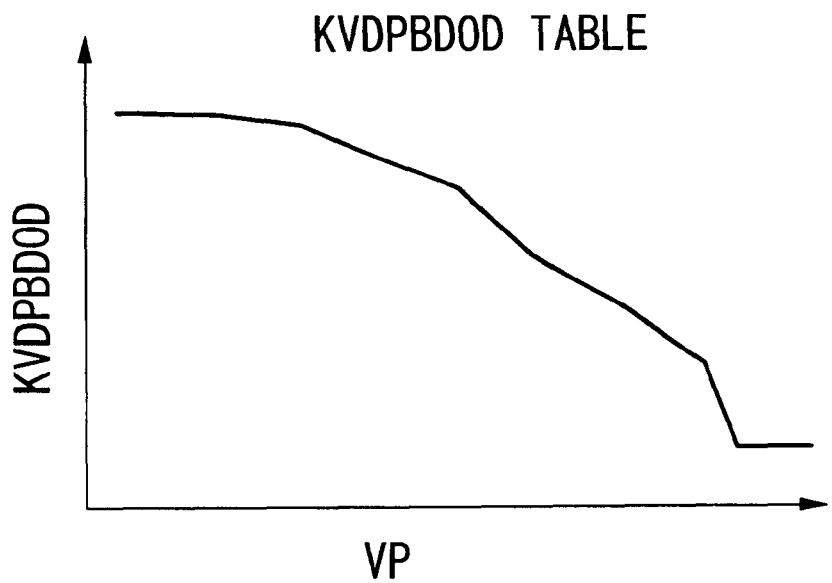
FIG. 21 is a graph showing the correction coefficient in accordance with the vehicle speed.

In step S210, the vehicle speed correction value KVDPBDOD of the throttle assist trigger DOD correction value is obtained by table retrieval of the table shown in FIG. 21.

Subsequently, in step S211, th air intake passage pressure assist trigger correction value DPBAST is obtained based on the DOD limit control mode correction value DPBDOD obtained in step S206 or S208, the DOD limit control mode voltage correction value KEDOD obtained in step S207, and the throttle assist trigger DOD correction value vehicle speed correction value KVDPBDOD obtained in step S210, and the program is completed.

Accordingly, when the vehicle is in the DOD limit control mode, the assist trigger threshold value is raised based on the DOD limit control mode correction value DPBDOD obtained in step S206 and the throttle assist trigger DOD correction value vehicle speed correction value KVDPBDOD obtained in step S210. However, when the remaining capacitor charge is sufficiently high, it becomes possible to reduce the increase amount of the assist trigger threshold value by the DOD limit control mode voltage correction value KEDOD determined according to the initial value VCAPINT of the capacitor voltage VCAP obtained in step S207, so that it is possible to prevent difficulty in entering the acceleration mode when the remaining capacitor charge is high.

That is, since it is possible to decrease the increase amount of the assist trigger threshold value when the initial value VCAPINT of the capacitor voltage VCAP is higher than the case of low capacitor voltage, the vehicle is not controlled so that there is always the same resistance to enter the acceleration mode. When the initial value VCAPINT of the capacitor voltage is higher the case of lower voltage, it is easier for the vehicle to enter the acceleration mode, which results in improving the drivability for the driver.

PB Assist Trigger Correction (CVT)

Figure 20:
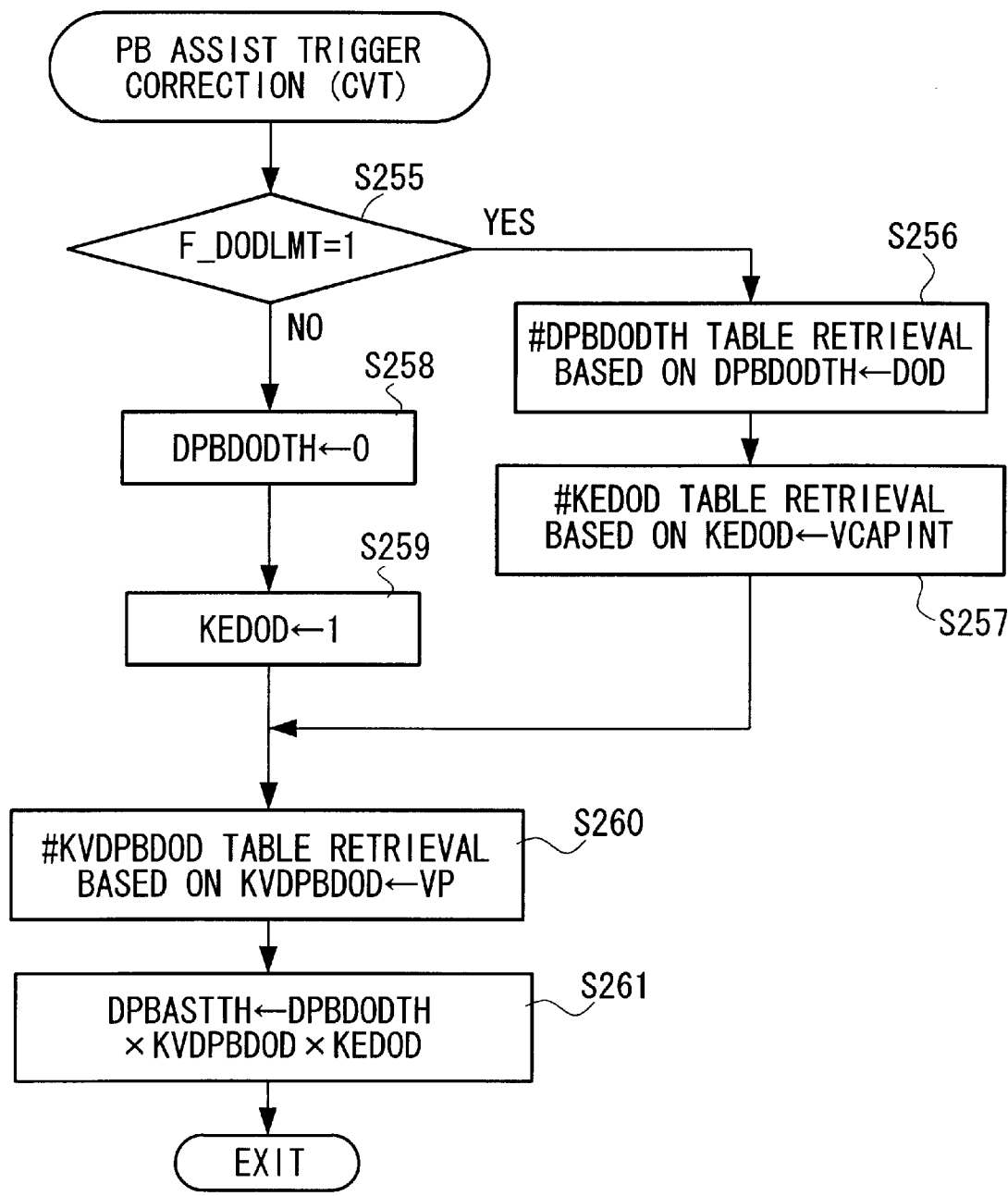
FIG. 20 is a flowchart showing the PB assist trigger correction (for CVT vehicle).

FIG. 20 is a flowchart showing the air intake passage pressure throttle assist trigger correction in the above-described step S123.

Figure 22:
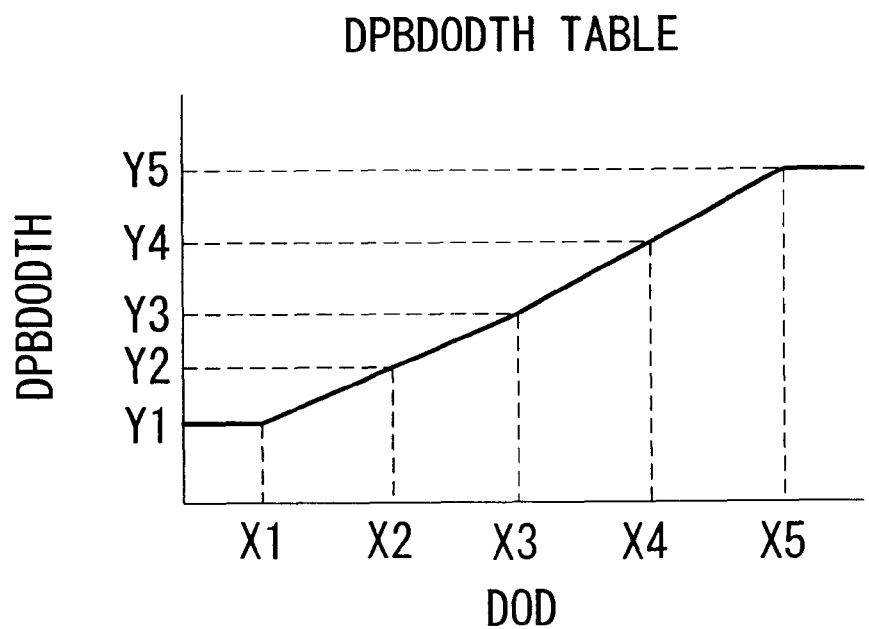
FIG. 22 is a graph showing the correction table for the depth-of-discharge limit control.

In step S255, it is determined whether the limit control for the depth-of-discharge DOD of the capacitor is released by determining whether the DOD limit determination flag F_DODLMT is "1". When the determination indicates that the vehicle is in the depth-of-discharge limit control mode, the DOD limit control mode correction value is table retrieved referring to the table shown in FIG. 22, and after the DOD limit control mode correction value is set to the retrieved value, the flow proceeds to step S257. In step S257, the DOD limit control mode voltage correction value #KEDOD is table retrieved referring to the table shown in FIG. 19 based on the initial value VCAPINT of the capacitor VCAP and the flow proceeds to step S260.

In contrast, when it is determined that the depth-of-discharge limit control mode has been released, the flow proceeds to step S258, and after the DOD limit control mode correction value DPBDODTH is set to "0", and the flow proceeds to step S259.

In this case, the predetermined value #DPBDODTH is set to a positive value in order to raise the increase the determination value for the motor assist and to decrease the frequency of motor assists when the vehicle is in the depth-of-charge limit control mode. Thus, when the vehicle is in the depth-of-discharge limit control mode, it is possible to reduce the frequency of the motor assist, so that the remaining capacitor charge can be recovered rapidly.

Subsequently, in step S259, the DOD limit control mode voltage correction value KEDOD is set to "1" and the flow proceeds to step S260.

In step S260, the throttle assist trigger DOD correction value vehicle speed correction coefficient KVDPBDOD based on the control vehicle speed VP is table retrieved referring to the table shown in FIG. 21.

In the subsequent step S261, the air intake passage pressure assist trigger correction value DPBASTTH is obtained based on the depth-of-discharge limit control mode correction value DPBDODTH obtained in steps S256 or S258, the DOD limit control mode voltage correction value KEDOD obtained in step S257, and the throttle assist trigger DOD correction value vehicle speed correction coefficient KVDPBDOD obtained in step S260 and the program is completed.

Accordingly, when the vehicle is in the DOD limit control mode, the assist trigger threshold value is raised based on the DOD limit control mode correction value DPBDODTH obtained in step S256 and the throttle assist trigger DOD correction value vehicle speed correction value KVDPBDOD obtained in step S260. However, when the remaining capacitor charge is sufficiently high, it becomes possible to reduce the amount of increase of the assist trigger threshold value by the DOD limit control mode voltage correction value KEDOD determined according to the initial value VCAPINT of the capacitor voltage VCAP obtained in step S257, so that it is possible to prevent the difficulties in entering the acceleration mode when the remaining capacitor charge is high.

That is, since it is possible to decrease the increasing amount of the assist trigger threshold value when the initial value VCAPINT of the capacitor voltage VCAP is higher than the case of a low capacitor voltage, the vehicle is not controlled so that there is always the same difficulty in entering the acceleration mode. When the initial value VCAPINT of the capacitor voltage is higher than the case of lower voltage, it becomes easier for the vehicle to enter the acceleration mode, which results in improving the drivability for the driver.

Air Intake Passage Pressure Assist Trigger Calculation (MT)

Figure 23:
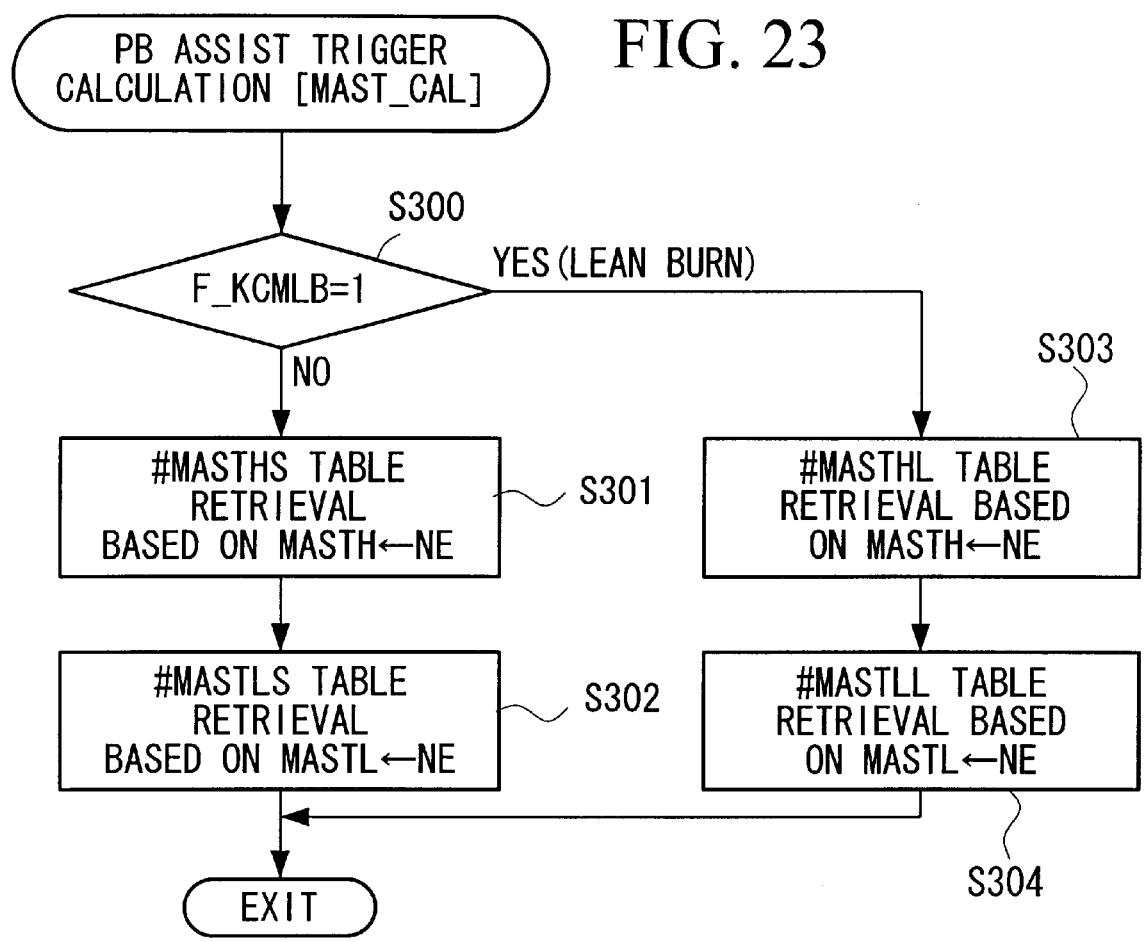
FIG. 23 is a flowchart showing the PB assist trigger calculation (for MT vehicle).

FIG. 23 shows a flowchart for calculating the air intake passage pressure assist trigger (for MT).

In step S300, it is determined whether the lean bum determination flag F_KCMLB is "1". When the determination is "YES", that is, when it is determined that the engine is in the lean burn state, the flow proceeds to step S303 wherein, as shown in FIG. 24, a high threshold value #MASTH of the air intake passage pressure assist trigger is table retrieved based on the engine rotational speed NE referring to the air intake passage pressure assist trigger MASTHL table.

Figure 11:
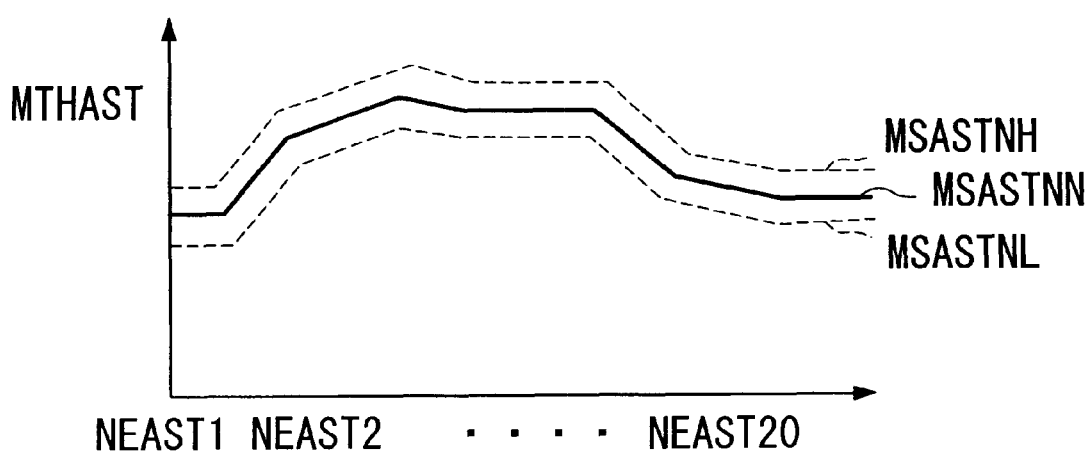
FIG. 11 is a graph showing the threshold values in the TH (throttle opening state) assist mode and in the PB (air intake passage pressure) assist mode.
Figure 12:
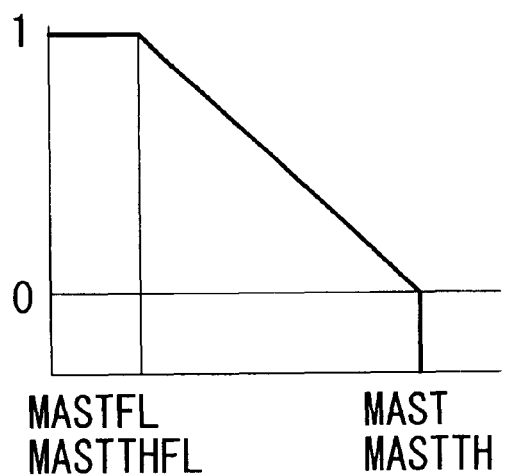
FIG. 12 shows a graph for calculating values in steps S120 and S132.
Figure 24:
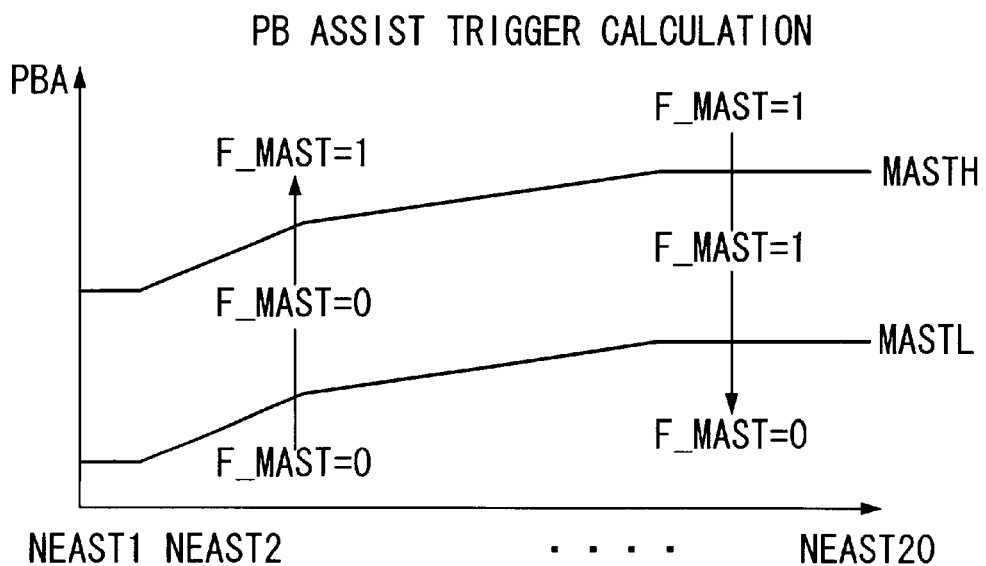
FIG. 24 is a graph showing PB assist trigger threshold values for MT vehicles.

In the above-described air intake passage pressure assist trigger table shown in FIG. 24, two solid lines, for determining whether the motor assist is performed, are defined, in which one is the upper air intake passage pressure assist trigger threshold value MASTH and the other is the lower air intake passage pressure assist trigger threshold value MASTL. In the above retrieval processing, when the air intake passage pressure PBA, as it is increased or as the engine rotational speed NE is decreased, crosses the upper threshold value line MASTH from the lower area to the upper area as shown in FIG. 11, the motor assist determination flag F_MAST is switched from "0" to "1". When the air intake passage pressure PBA, as it is decreased or as the engine rotational speed NE is increased, crosses the lower threshold value line MASTHL from the upper area to the lower area, the motor assist determination flag F_MAST is switched from "1" to "0".

Accordingly, in step S303, when the air intake passage pressure crosses the upper threshold value line MASTH from the higher area to the lower area, the motor assist determination flag F_MAST is switched from "0" to "1". In the subsequent step S304, the lower threshold value #MASTL is retrieved referring to the MASTL table based on the engine rotational speed NE and when the air intake passage pressure crosses the lower threshold value line MASTL from the higher area to the lower area, the motor assist determination flag F_MAST is switched from "1" to "0".

When the determination in step S300 is "NO", indicating that the engine is in the stoichiometric burn state, the flow proceeds to step S301, wherein #MASTHS is table retrieved based on the engine rotational speed NE referring to the air intake passage pressure assist trigger table for the stoichiometric burn.

The air intake passage pressure assist trigger table for the stoichiometric burn provides, similar to FIG. 24, two solid lines which define the high air intake passage pressure assist trigger threshold value MASTH and the low air intake passage pressure assist trigger threshold value MASTL based on the engine rotational speed NE for determining whether the motor assist is required. In the above table retrieval, when the air intake passage pressure PBA, as it increases or as the engine rotational speed decreases, crosses the upper threshold value line MASTH from the lower area to the higher area, the motor assist determination flag F_MAST is switched from "0" to "1". In contrast, when the lower threshold value line MASTL is retrieved based on the engine rotational speed NE and when the air intake passage pressure crosses the lower threshold value line MASTL from the higher area to the lower area, the motor assist determination flag F_MAST is switched from "1" to "0".

Accordingly, in step S301, when the high threshold value line MASTH is crossed from the lower area to the higher area, as the air intake passage pressure PBA increases or as the engine rotational speed NE decreases, the motor assist determination flag F_MAST is switched from "0" to "1". In contrast, when the air intake passage pressure PBA, as it decreases or the engine rotational speed NE increases, crosses the low throshold line from the upper area to the lower area, the motor assist determination flag F_MAST is switched from "1" to "0".

Accordingly, in step S301, when the air intake passage pressure PBA crosses the higher threshold line MASTH from the lower area to the upper area, the motor assist determination flag F_MAST is switched from "0" to "1". In the subsequent step S302, the lower threshold value MASTL of the air intake passage pressure assist trigger is retrieved based on the engine rotational speed NE referring to the #MASTL table, and when the air intake passage pressure PBA crosses the lower threshold line MASTL from the upper area to the lower area, the motor assist determination flag F_MAST is switched from "1" to "0". It is noted that the air intake passage pressure assist trigger table is provided for each gear position, and the table retrieval is carried out depending on the gear position.

Air Intake Passage Pressure Assist Trigger Calculation (CVT)

Figure 25:
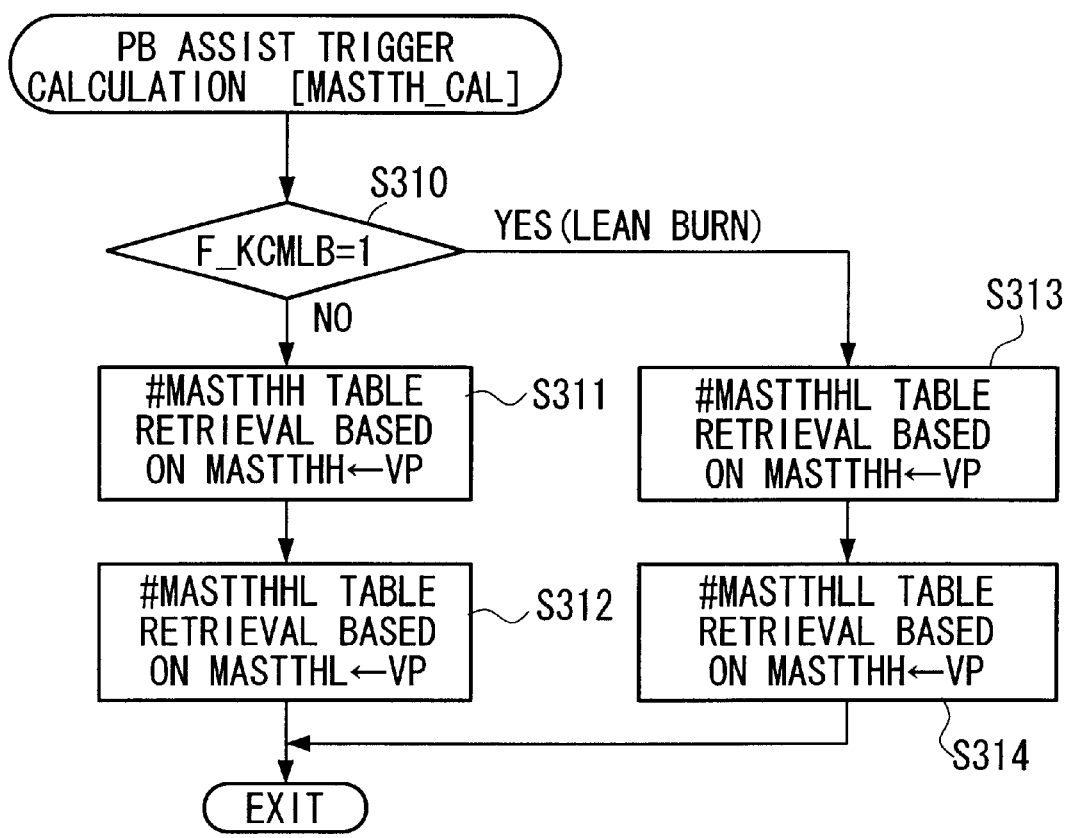
FIG. 25 is a flowchart showing PB assist trigger calculation (for CVT vehicle).

FIG. 25 shows a flowchart for calculating the air intake passage pressure assist trigger (for CVT).

In step S310, it is determined whether the lean burn determination flag F_KCMLB is "1". When the determination is "YES", that is, when it is determined that the engine is in the lean burn state, the flow proceeds to step S313, wherein, as shown in FIG. 26, an upper threshold value MASTHH of the air intake passage pressure assist trigger is table retrieved based on the engine rotational speed NE referring to the air intake passage pressure assist trigger MASTHHL table.

Figure 26:
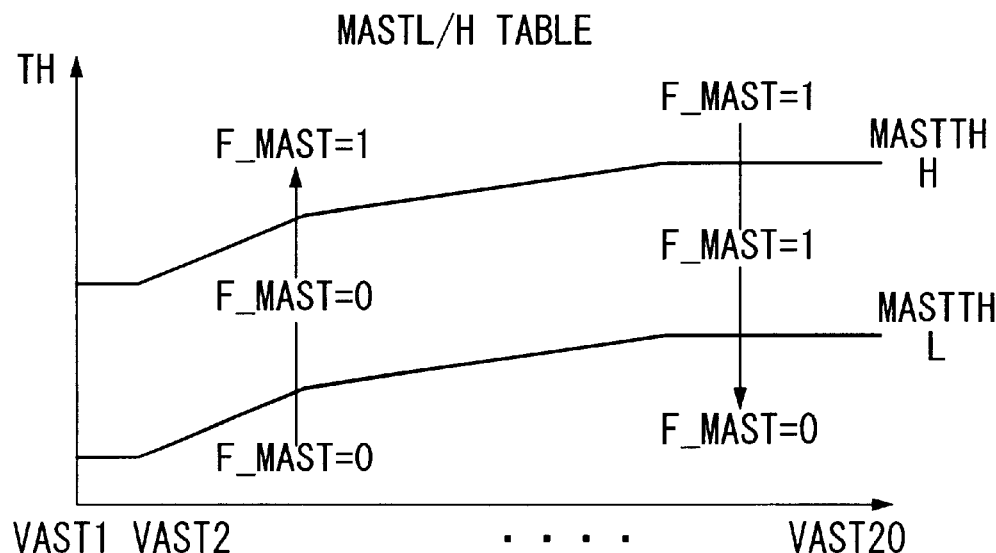
FIG. 26 is a graph showing threshold values in the PB assist mode for CVT vehicles.

In the above-described air intake passage pressure assist trigger table shown in FIG. 26, two solid lines, for determining whether the motor assist is performed, are defined, in which one is the upper air intake passage pressure assist trigger threshold value MASTHH and the other is the low air intake passage pressure assist trigger threshold value MASTHL. In the above retrieval processing, when the throttle opening state TH, as it is increased or as the engine rotational speed NE is decreased, crosses the upper threshold value line MASTHH shown in FIG. 26 from the lower area to the upper area, the motor assist determination flag F_MAST is switched from "0" to "1". In contrast, when the throttle opening TH, as it is decreased or as the engine rotational speed NE is increased, crosses the lower threshold value line MASTHL from the upper area to the lower area, the motor assist determination flag F_MAST is switched from "1" to "0".

Accordingly, in step S313, when the throttle opening TH crosses the upper threshold value line MASTH from the higher area to the lower area, the motor assist determination flag F_MAST is switched from "0" to "1". In the subsequent step S314, the lower threshold value #MASTHL is retrieved referring to the MASTL table based on the engine rotational speed NE and when the throttle opening TH crosses the lower threshold value line MASTL from the higher area to the lower area, the motor assist determination flag F_MAST is switched from "1" to "0".

When the determination in step S310 is "NO", indicating that the engine is in the stoichiometric burn state, the flow proceeds to step S311, wherein #MASTTHH is table retrieved based on the engine rotational speed NE referring to the air intake passage pressure assist trigger table MASTTHH for the stoichiometric burn.

It is noted that two solid lines are provided, similar to FIG. 26, which define the upper air intake passage pressure assist trigger threshold value MASTTHH and the lower air intake passage pressure assist trigger threshold value MASTTHL for determining whether the motor assist is required based on the vehicle speed VP. In the retrieval processing, when the throttle opening TH, as it is increased or as the control vehicle speed is increased, crosses the upper threshold value line MASTTHH line from the lower area to the upper area, the motor assist determination flag F_MAST is switched from "0" to "1". In contrast, when the throttle opening TH, as it is decreased or as the control vehicle speed VP is increased, the motor assist determination flag F_MAST is switched from "1" to "0".

Accordingly, in step S311, when the throttle opening crosses the upper threshold line MASTTHH from the lower area to the upper area, the motor assist flag is switched from "0" to "1". In the subsequent step S312, the lower threshold value #MASTTHL is retrieved based on the control vehicle speed VP referring to the MASTTHL table, and when the throttle opening TH crosses the lower threshold value MASTTHL from the upper area to the lower area, then the motor assist trigger determination flag F_MAST is switched from "1" to "0", and the program is completed.

Cruise Mode

Figure 27:
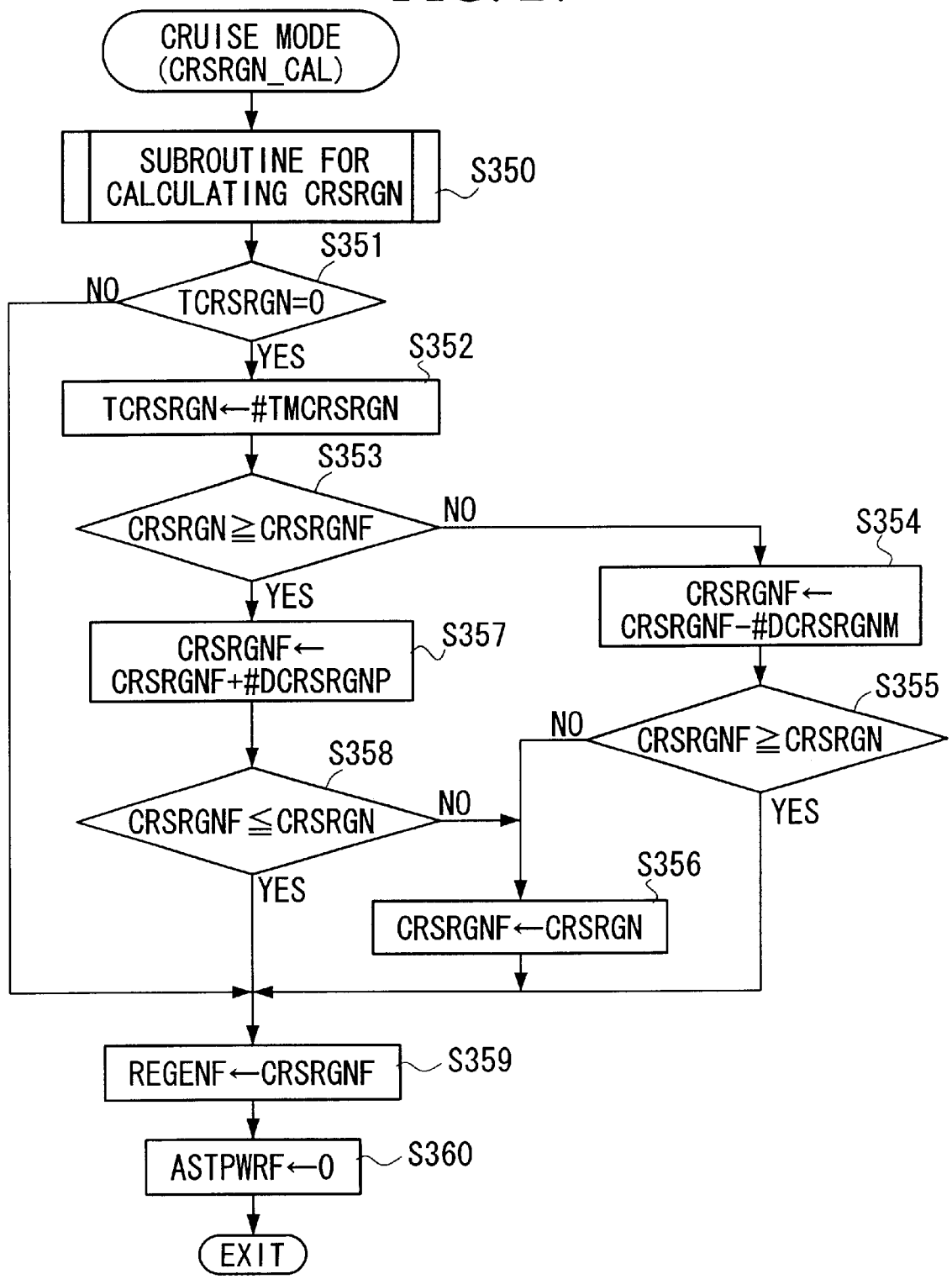
FIG. 27 shows a main flowchart in the cruise mode.
Figure 28:
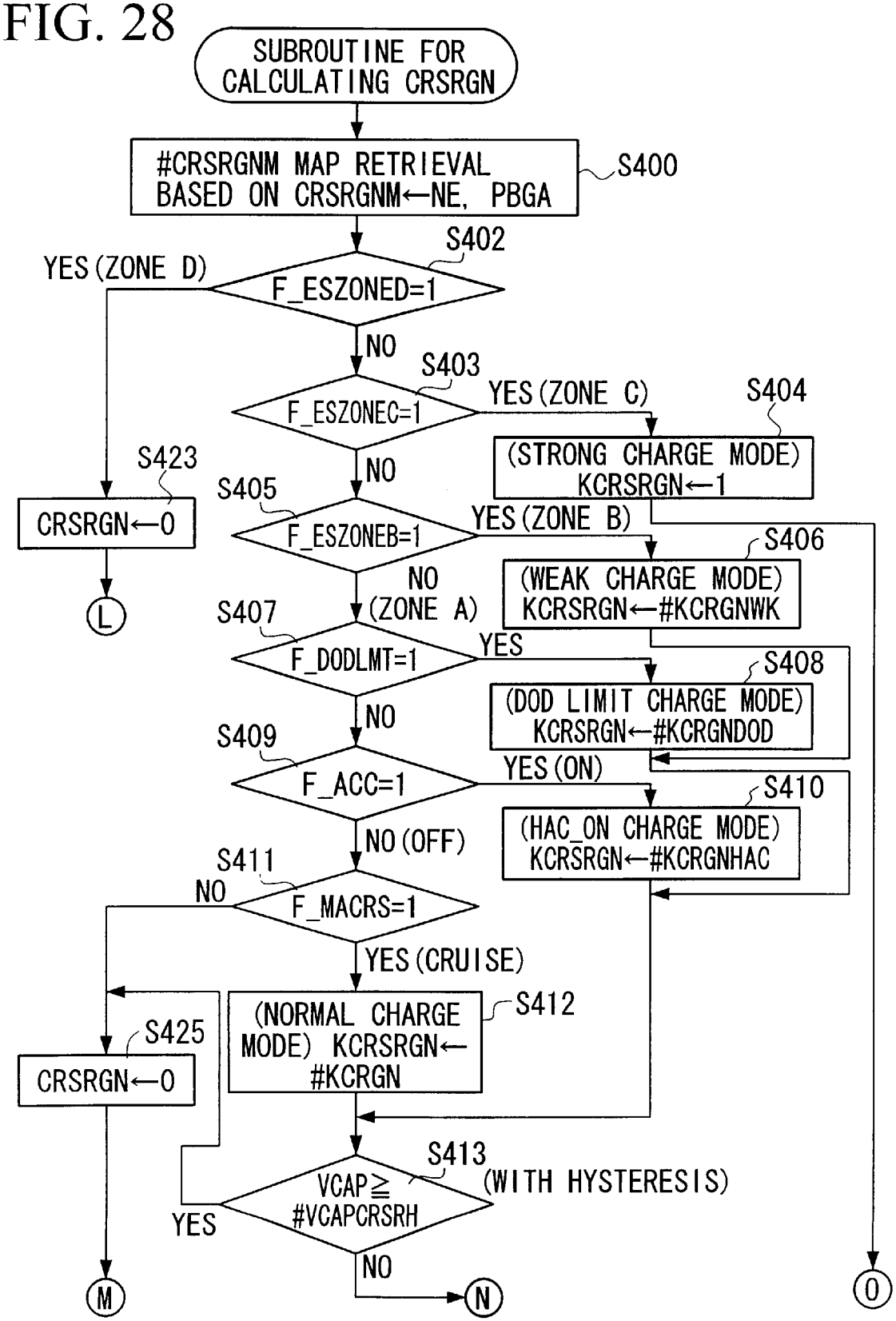
FIG. 28 shows a flowchart for calculating the cruise charge amount.
Figure 29:
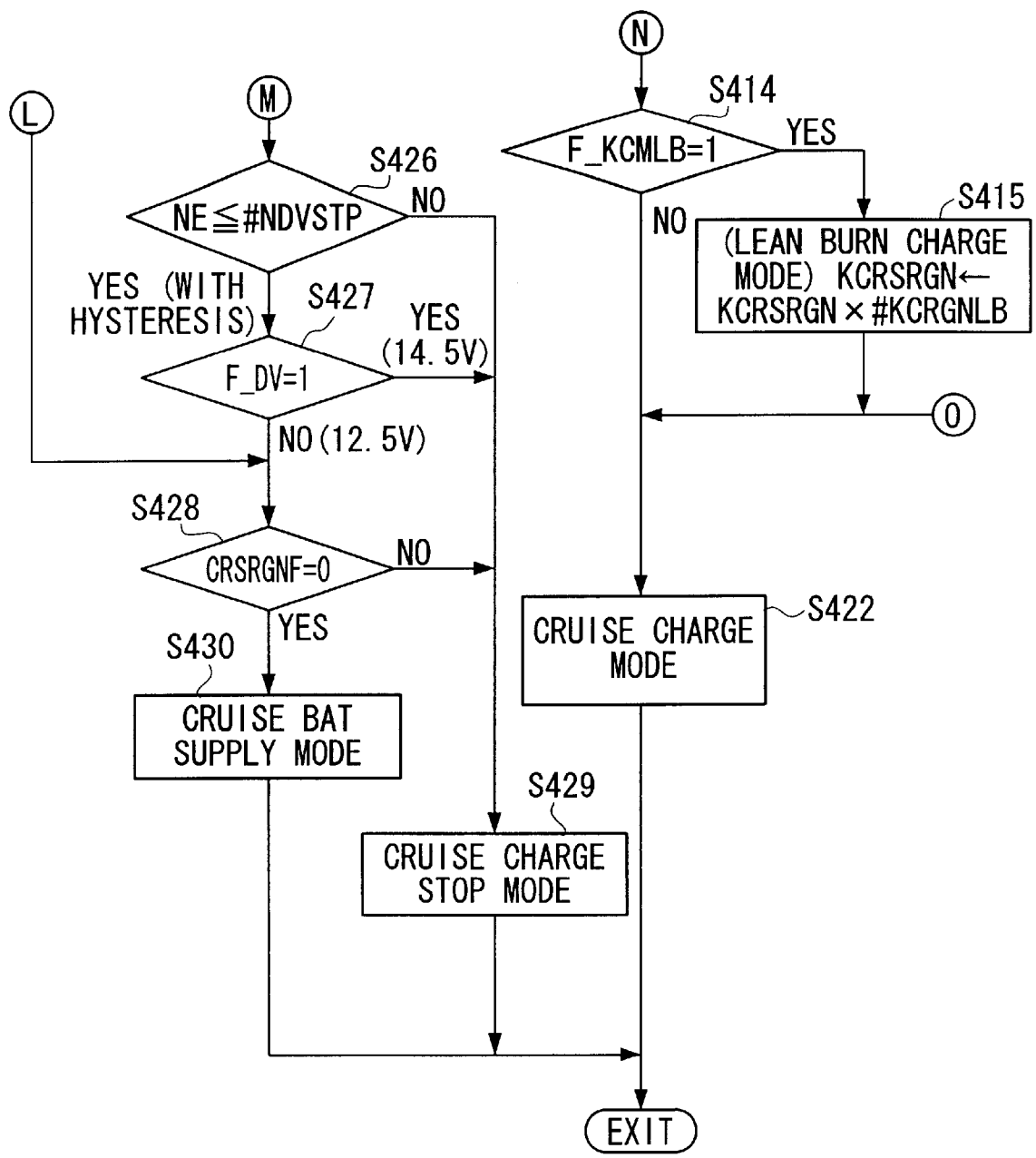
FIG. 29 is a flowchart showing the cruise charge amount calculation.

Next, the cruise mode will be explained with reference to FIGS. 27 to 29. First, the main flowchart of the cruise mode shown in FIG. 27 is described.

In step S350, a cruise charge amount calculation processing is performed which is described later in FIGS. 28 and 29. The flow proceeds to step S351, wherein it is determined whether a gradual addition subtraction timer TCRSRGN is "0". When the determination is "NO", the final cruise charge amount CRSRGNF is set to the final charge command value REGENF in step S359, the final assist command value ASTWRF is set to "0" in step S360, and the program is completed.

When the determination in step S353 is "YES", the flow proceeds to step S352, wherein the gradual addition subtraction timer TCRSRGN is set to a predetermined value #TMCRSRGN, and the flow proceeds to step S353. In step S353, it is determined whether the cruise charge amount CRSRGN is equal to or more than the final cruise charge amount CRSRGNF.

When the determination in step S353 is "YES", the flow proceeds to step S357, wherein the gradual addition value #DCRSRGN is gradually added to the final cruise charge amount CRSRGN and it is determined again in step S358 whether the cruise charge amount CRSRGN is equal to or more than the final cruise charge amount CRSRGNF. When it is determined in step S358 that the cruse charge amount CRSRGN is equal to or more then the final cruise charge amount CRSRGNF, the flow proceeds to step S359.

When it is determined in step S358 that the cruise charge amount CRSRGN is less than the final cruise charge amount CRSRGNF, the flow proceeds to step S356. where the cruise charge amount CRSRGN is set to the final cruise charge amount CRSRGNF and the flow proceeds to step S359.

When the determination in step S353 is "NO", the flow proceeds to step S354, wherein a gradual subtraction value #DCRSRGN is subtracted gradually from the final cruise charge amount CRSRGNF and it is determined in step S355 whether the final cruise charge CRSRGNF is equal to or higher than the cruise charge amount CRSRGN. When the determination in step S355 indicates that the cruise charge amount CRSRGN is equal to or more than the final cruise charge amount CRSRGNF, the flow proceeds to step S356. When the determination in step S355 indicates that the final cruise charge CRSRGNF is higher than the cruise charge amount CRSRGN, the flow proceeds to step S359.

Thereby, processing after step S351 allows the vehicle to transfer to the cruise mode smoothly by absorbing the abrupt change of power generation.

Next, a flowchart for executing a cruise charge calculation in step S350 shown in FIG. 27 is explained below with reference to FIGS. 28 and 29.

In step S400, a map value CRSRGNM for the cruise charge is retrieved. The map indicates the power generation determined by the engine rotational speed NE and the air intake passage pressure PBGA, and two maps, one for for MT vehicles and another for for CVT vehicles are provided for use.

Subsequently, the flow proceeds to step S402 for determining whether the energy storage zone determination flag F_ESZONED is "1". When the determination is "YES", that is, when the remaining capacitor charge is in within zone D, the flow proceeds to step S423, wherein the cruise charge amount CRSRGN is set to "0", and the flow further proceeds to step S428. In step S428, it is determined whether the final cruise charge command value CRSRGNF is "0". When it is determined in step S428 that the final cruise charge command value CRSRGNF is not "0", the flow proceeds to step S429 to enter a cruise charge stop mode and the program is completed. When the determination in step S428 indicates that the command value is "0", the flow proceeds to step S430 to enter a cruise capacitor charge mode and the program is completed.

When the determination in step S402 is "NO", that is, when the remaining charge of the capacitor is outside zone D, the flow proceeds to step S403, wherein it is determined whether the energy storage zone C determination flag F_ESZONEC is "1". When the determination is "YES", indicating that the remaining capacitor charge is within zone C, the flow proceeds to step S404, wherein the correction coefficient KCRSRGN of the cruise charge amount is set to "1" (for the strong charge mode), and the flow proceeds to step S422 to enter the cruise charge mode and the program is completed. When the determination in step S403 is "NO", that is, when the remaining charge of the capacitor is outside zone C, the flow proceeds to step S405.

In step S405, it is determined whether the energy storage zone B determination flag F_ESZONEB is "1". When the determination is "YES", that is, when the remaining charge of the capacitor is within zone B, the flow proceeds to step S406. In step S406, the correction coefficient KCRSRGN of the cruise charge amount is set to the cruise charge amount coefficient #KCRGNWK (for the weak charge mode), and the flow proceeds to step S413.

In contrast, when the determination in step S405 is "NO", indicating that the remaining charge of the capacitor is outside zone B, it is determined in the subsequent step S407 whether the DOD limit determination flag F_DODLMT is "1". When the determination in step S407 is "YES", the flow proceeds to step S408, wherein the correction coefficient KCRSRGN of the cruise charge amount is set to the cruise charge amount coefficient #KCRGNDOD (for the DOD limit charge mode), and the flow proceeds to step S413. It is noted that the DOD limit charge mode is the mode for controlling the assist amount or the cruise charge amount so as to recover the remaining charge of the capacitor when the initial value VCAPINT of the capacitor voltage VCAP decreases a certain amount.

Thereby, it is possible to recover the remaining charge of the capacitor rapidly by setting an increased amount of electric energy to be generated, above the usual amount.

In contrast, when the determination in step S407 is "NO", the flow proceeds to step S409, wherein, an air conditioner ON flag F_MACRS is "1". When the determination is "YES", that is, it is determined that the air conditioner is "ON", the flow proceeds to step S410, wherein the correction coefficient KCRSRGN of the cruise charge amount is set to the cruise charge amount coefficient #KCRGNHAC (for the HAC_ON mode), and the flow proceeds to step S413.

When the determination in step S409 is "NO", that is, it is determined that the air conditioner is "OFF", it is determined in the subsequent step S411 whether the cruise mode determination flag F_MACRS is "1". When the determination in step S411 is "NO", indicating that the vehicle is not in the cruise mode, the cruise charge amount CRSRGN is set to "0" in step S425 and the flow proceeds to step S426.

When the determination in step S411 is "NO", indicating that the vehicle is in the cruise mode, the cruise charge amount CRSRGN is set to the cruise charge amount coefficient #KCRGN (for the normal charge mode) and the flow proceeds to step S413.

Subsequently, it is determined in step S426 whether the engine rotational speed NE is lower than the upper limit engine rotational speed #NDVSTP for executing the cruise capacitor supply mode. When the determination is "YES", that is, it is determined that the engine rotational speed≦the cruise capacitor supply mode execution upper limit engine rotational speed #NDVSTP, the flow proceeds to step S427. It is determined in step S427 whether the downverter flag F_DV is "1". When the determination is "YES", indicating that the downverter flag F_DV is "1", the flow proceeds to step S429. When the determination in step S427 is "NO", indicating that the downverter flag F_DV is "0", the flow proceeds to step S428.

When the determination in step S426 is "NO", that is, when it is determined that the engine rotational speed VP>the cruise capacitor supply mode execution upper limit engine rotational speed #NDVSTP, the flow proceeds to step S429. It is noted that the above-described cruise capacitor supply mode execution upper limit engine rotational speed #NDVSTP is a value having hysteresis.

When the determination in step S413 is "YES", that is, when it is determined that the capacitor voltage≧the normal charge mode execution upper limit voltage #VCAPCRSRH, the flow proceeds to step S425.

When it is determined that the capacitor voltage<the normal charge mode execution upper limit voltage #VCAPCRSRH, it is determined in step S414 whether the lean burn determination flag F_KCMLB is "1". When the determination is "YES", that is, it is determined in step 415 that the engine is in the lean burn state, the correction coefficient KCRSRGN of the cruise charge amount is set to a product of multiplication of the correction coefficient KCRSRGN of the cruise charge amount with the cruise charge amount coeffecent #KCRGNLB, and the flow proceeds to step S422. When the determination in step S414 is "NO", indicating that the engine is not in the lean burn mode, then the flow proceeds to step S422 and the engine is shifted to the cruise charge mode and the program is completed.

In this embodiment, when it is detected that the capacitor voltage VCAP is decreased below the depth-of-discharge limit value DODLMT by running with repeated rapid acceleration and deceleration without being able to acquire sufficient regeneration energy or by going uphill and then running on the ground without being able restore the remaining charge of the capacitor, the present control device is able to recover the remaining charge of the capacitor 3 so that the charge-discharge balance of the capacitor can be recovered.

Especially when the vehicle is in the depth-of-discharge limit control mode, the remaining charge of the capacitor 3 can be increased quickly depending on the depth-of-charge DOD by increasing the cruise frequency by raising the assist trigger threshold value in response to the depth-of-discharge DOD.

On the other hand, since it is possible to change, in accordance with the initial value VCAPINT of the capacitor voltage VCAP, the increasing amount of the assist trigger threshold value and the throttle assist trigger correction value DTHAST, the correction value DPBAST, and the coefficient to be multiplied with the air intake passage pressure assist trigger correction value DPBASTTH (the DOD limit control mode remaining charge correction values KPDOD and KEDOD), the effect of the depth-of-discharge limit control mode can be reduced when the initial remaining charge is high.

Accordingly, even when the initial remaining charge of the capacitor is high, it is possible to improve the drivability by preventing the difficulties in entering the acceleration mode.

In this embodiment, the remaining charge of the capacitor can be ensured and an optimized depth-of-discharge limit control can be executed by setting the depth-of-discharge limit value DODLMT at a higher value when the vehicle speed is high within a certain vehicle speed range, since the present system is provided such that the remaining charge of the capacitor can be recovered even if a large depth-of-discharge limit value DODLMT is set when the control vehicle speed is high because greater energy can be recovered by regeneration as the controlling vehicle speed VP increases.

As shown in FIG. 6, since the present system is provided such that, when the control vehicle speed increases to a certain range, the release voltage increase value VCAPUP of the depth-of-discharge is set to a smaller value as the control vehicle speed VP increases, in order to prevent an increase of the depth-of-discharge limit value release voltage increase value #VCAPUP by reducing the depth-of-discharge. limit value release voltage increase value #VCAPUP because the regenerative energy is large when the control speed is high, it becomes possible to execute the optimum depth-of-discharge limit control by preventing the unnecessary charging of the capacitor.

Therefore, it becomes possible to perform reliable management of the capacitor which has a smaller capacity than a battery.

It is noted that the present invention is not limited to the above-described embodiment. Although the depth-of-discharge limit determination in the above embodiment is performed using a value related to the voltage in response to the capacitor voltage VCAP, the determination can be made using a value related to the remaining charge of the capacitor. For example, the initial value SOCINT of the remaining charge (state of charge) of the capacitor can be used in place of the initial value VCAPINT of the capacitor voltage VCAP, the depth-of-discharge limit value DODLMT represented as the voltage can be used as the decreased remaining charge, or the depth-of-discharge limit value release voltage increase value #VCAPUP cn be used as the depth-of-discharge limit release remaining charge increase value #SOCUP.

What is claimed is:

1. A control device for a hybrid vehicle provided with an engine and a motor, at least one of which is used as a driving source, and a power storage unit for storing energy generated by the output from said engine and regenerative energy produced by regeneration by said motor when said vehicle decelerates, comprising:

a depth of discharge detecting device for detecting a depth-of-discharge of said power storage unit;

a depth-of-discharge threshold value setting device for setting a threshold value of the depth-of-discharge of said power storage unit based on a value associated with kinetic energy of the vehicle from an initial depth-of-discharge at the time of starting of the vehicle; and a charge control device for charging said power storage unit when the depth-of-discharge of said power storage unit exceeds said threshold value of the depth-of-discharge.

2. A control device for a hybrid vehicle according to claim 1, wherein a vehicle speed is used for said value associated with kinetic energy of the vehicle.

3. A control device for a hybrid vehicle according to claim 1, wherein said charge control device comprises a charge setting device for setting the charge based on the value associated with the vehicle speed when said depth-of-discharge exceeds the threshold value.

4. A control device for a hybrid vehicle provided with an engine and a motor, at least one of which is used as a driving source, and a power storage unit for storing energy generated by the output from said engine and regenerative energy produced by regeneration by said motor when said vehicle decelerates, comprising:

a depth of discharge detecting device for detecting a depth-of-discharge of said power storage unit;

a depth-of-discharge threshold value setting device for setting a threshold value of the depth-of-discharge of said power storage unit based on a value associated with kinetic energy of the vehicle from an initial depth-of-discharge at the time of starting of the vehicle; and a charge control device for charging said power storage unit when the depth-of-discharge of said power storage unit exceeds said threshold value of the depth-of-discharge, wherein, when charging said power storage unit, said charge control device further comprises a charge increasing device for increasing the charge to a higher value after the depth-of-discharge exceeds the threshold value than that before the discharge amount exceeds said threshold value.

5. The control device for a hybrid vehicle according to claim 4, wherein a vehicle speed is used for said value associated with kinetic energy of the vehicle.

6. A control device for a hybrid vehicle provided with an engine and a motor, at least one of which is used as a driving source, and a power storage unit for storing energy generated by the output from said engine and regenerative energy produced by regeneration by said motor when said vehicle decelerates, comprising:

a depth of discharge detecting device for detecting a depth-of-discharge of said power storage unit;

a depth-of-discharge threshold value setting device for setting a threshold value of the depth-of-discharge of said power storage unit based on a value associated with kinetic energy of the vehicle from an initial depth-of-discharge at the time of starting of the vehicle; and a charge control device for charging said power storage unit when the depth-of-discharge of said power storage unit exceeds said threshold value of the depth-of-discharge, wherein, while executing the control charge of said power storage unit by the charge control device, said control device of the hybrid vehicle comprising a motor drive limit control device limits driving of the vehicle by the motor.

7. A control device for a hybrid vehicle according to claim 6, wherein said motor drive limit control device corresponds to a determination threshold value modification device which modifies the motor drive determination threshold value based on the driving state of the vehicle so as to make it difficult to drive the vehicle by the motor.

8. The control device for a hybrid vehicle according to claim 6, wherein said charge control device comprises a charge setting device for setting the charge based on the value associated with the vehicle speed when said depth-of-discharge exceeds the threshold value.

* * * * *